(12) United States Patent
Nie et al.

(10) Patent No.: US 11,803,509 B1
(45) Date of Patent: Oct. 31, 2023

(54) PARALLEL MERGE SORTER CIRCUIT

(71) Applicant: Apple Inc., Cupertino, CA (US)

(72) Inventors: Xiaoning Nie, Neubiberg (DE);
Mathias Kohlenz, San Diego, CA (US); Jin-Soo Yoo, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,632

(22) Filed: May 23, 2022

(51) Int. Cl.
*G06F 15/80* (2006.01)
(52) U.S. Cl.
CPC .............................. *G06F 15/8061* (2013.01)
(58) Field of Classification Search
None
See application file for complete search history.

(56) References Cited

U.S. PATENT DOCUMENTS

| 5,084,815 | A | * | 1/1992 | Mazzario | G06F 7/36 715/255 |
| 5,274,835 | A | * | 12/1993 | Wakatani | G06F 7/32 340/146.2 |
| 10,831,478 | B2 | | 11/2020 | Giamei et al. | |
| 2008/0208861 | A1 | * | 8/2008 | Ray | G06F 7/36 |
| 2015/0278299 | A1 | * | 10/2015 | Kim | G06F 7/36 707/752 |
| 2016/0283549 | A1 | | 9/2016 | Hux | |
| 2019/0138494 | A1 | | 5/2019 | Inoue | |
| 2019/0347071 | A1 | | 11/2019 | Mackinnon, Jr. | |
| 2020/0142669 | A1 | * | 5/2020 | Giamei | G06F 9/30021 |
| 2020/0159492 | A1 | | 5/2020 | Sadi et al. | |

OTHER PUBLICATIONS

Dementiev, R. et al., Better External Memory Suffix Array Construction, 2008, ACM, 24 pages. (Year: 2008).*
Casper, J. et al., Hardware Acceleration of Database Operations, 2014, ACM, pp. 151-160. (Year: 2014).*
Watkins, A. et al., A Fast and Simple Approach to Merge and Merge Sort using Wide Vector Instructions, 2018, IEEE, pp. 37-44. (Year: 2018).*
Song, Wei et al., "Parallel Hardware Merge Sorter," Computer Science. 2016 IEEE, 24th Annual International Symposium on Field-Programmable Custom Computing Machines (FCCM). 8 pages.
Batcher, K. E., "Sorting Networks and Their Applications," Goodyear aerospace Corporation. Spring Joint Computer Conference, 1968. pp. 307-314.

* cited by examiner

*Primary Examiner* — Eric Coleman
(74) *Attorney, Agent, or Firm* — KILPATRICK TOWNSEND & STOCKTON LLP

(57) ABSTRACT

A merge sort circuit can include a parallel merge sort core that performs a partial merge on two input tuples, each containing a number P of data elements sorted according to a sort key, to produce a sorted output tuple of P data elements. Input data blocks to be merged can be stored in first and second block buffers. The block buffers can receive data from a vector memory read interface that reads groups of at least P data elements at a time. Loading of data elements into the block buffers can be based on respective fill levels of the block buffers.

20 Claims, 12 Drawing Sheets

PARALLEL MERGE SORTER CIRCUIT

BACKGROUND

This disclosure relates generally to circuits for data sorting and in particular to parallel merge sorter circuits.

A common task in digital signal processing and other data processing is sorting of a list of data elements. For example, it may be desirable to sort a set of data elements according to some metric to select a subset of elements having the highest metrics (which can be, e.g., largest or smallest numeric values, depending on how the metric and the sort operation are defined). One example use-case is in processing of decoded data packets that may be received out of order via a wireless network. To facilitate placing the data in order, each data packets typically includes a sequential identifier, and after decoding the packets, the data packets can be placed in order by sorting the data packets based on the sequential identifiers. To support the data throughput requirements of modern high-speed data networks such as 5G New Radio networks, sorting operations need to be performed reliably and with high throughput.

SUMMARY

Certain embodiments described herein relate to circuits that can be used to accelerate sorting operations in a vector processor. In some embodiments, a merge sort circuit can include a parallel merge sort core that performs a partial merge on two input tuples, each containing a number P of data elements sorted according to a sort key, to produce a sorted output tuple of P data elements. In some embodiments, the parallel merge sort core can produce a sorted output tuple at a rate of one tuple per clock cycle. Input data blocks to be merged can be stored in first and second block buffers. The block buffers can receive data from a vector memory read interface that reads groups of at least P data elements at a time. Loading of data elements into the block buffers can be based on respective fill levels of the block buffers.

Certain embodiments relate to a merge sort circuit that can comprise: a parallel merge sort core; a first input buffer; a second input buffer; a vector memory read interface circuit; and a read control logic circuit. The parallel merge sort core can include a partial merge sort circuit having a first set of inputs to receive a first input tuple including at least two first data elements sorted according to a sort key and a second set of inputs to receive a second input tuple including at least two second data elements sorted according to the sort key, the partial merge sort circuit being configured to produce a sorted output tuple including at least two data elements selected from the first and second input tuples and sorted according to the sort key and a selection signal indicating which of the data elements of the first and second input tuples were selected. The first input buffer can be configured to store a plurality of data elements in order from a first data stream, to provide the first input tuple to the parallel merge sort core, and to discard one or more stored data elements in response to a first feedback signal from the parallel merge sort core. The second input buffer can be configured to store a plurality of data elements from a second data stream, to provide the second input tuple to the parallel merge sort core, and to discard one or more stored data elements in response to a second feedback signal from the parallel merge sort core. The vector memory read interface circuit can be configured to provide a first data stream for a first input data block to the first input buffer and a second data stream for a second input data block to the second input buffer. The read control logic circuit can be coupled to the first input buffer and the second input buffer and can be configured to control loading of data elements from the first data stream into the first input buffer and loading of data elements from the second data stream into the second input buffer based on respective fill levels of the first input buffer and the second input buffer. In some embodiments, a merge sort circuit can also include a control interface configured to coordinate operation of the read control logic circuit and the parallel merge sort core to execute a plurality of sorting rounds on a data set having a plurality of data elements, wherein one or more of the sorting rounds includes using the parallel merge sort core to sort a pair of input data blocks to produce an output data block that includes the data elements in the pair of input data blocks.

In some embodiments, the parallel merge sort core can also include: a first barrel shifter; a second barrel shifter; and a merge sort control logic circuit. The first barrel shifter can have a plurality of output paths coupled to the first set of inputs of the partial merge sort circuit and a plurality of input paths to receive the first input tuple from the first input buffer, and the first barrel shifter can be configured to apply a first cyclic shift to the first input tuple. The second barrel shifter can have a plurality of output paths coupled to the second set of inputs of the partial merge sort circuit and a plurality of input paths to receive the second input tuple from the second input buffer, and the second barrel shifter can be configured to apply a second cyclic shift to the second input tuple. The merge sort control logic circuit can be coupled to the first barrel shifter, the second barrel shifter, and the partial merge circuit, and the merge sort control logic circuit can be configured to determine the first cyclic shift and the second cyclic shift for a given operating cycle based at least in part on the selection signal generated during a previous operating cycle. In some embodiments, the merge sort control logic circuit can include a first element counter and a second element counter, and the merge sort control logic circuit can be further configured to: increment the first element counter and the second element counter responsive to the selection signal; and generate control signals for the first barrel shifter and the second barrel shifter based on the first element counter and the second element counter. In some embodiments, the merge sort control logic circuit can also be configured to generate the first feedback signal for the first input buffer and the second feedback signal for the second input buffer based at least in part on the selection signal.

In some embodiments, a merge sort circuit can also include a memory having sufficient capacity to store the data elements in a data set being sorted and a vector memory write interface circuit configured to write a stream of the sorted output tuples to the memory. The vector memory read interface circuit can be configured to obtain the first data stream and the second data stream from the memory. In some embodiments, the memory can include two buffers, each buffer having sufficient capacity to store the data elements in a data set being sorted, and the vector memory read interface circuit and the vector memory write interface circuit can be configured to alternatingly read and write to the two buffers during a plurality of sorting rounds. In some embodiments, the vector memory read interface circuit can be configured to determine respective starting addresses for reading the first data stream and the second data stream based on a round counter and a size of the data set being sorted and to determine subsequent starting addresses by incrementing the starting addresses linearly.

In some embodiments, the read control logic circuit can also include: a presort circuit configured to receive a group of at least two unsorted data elements from the first data stream and to sort the group of at least two data elements into a block of at least two sorted data elements; a first multiplexer configured to selectably couple an output of the presort circuit or the first data stream to the first input buffer; and a second multiplexer configured to selectably couple the output of the presort circuit or the second data stream to the second input buffer.

In some embodiments, the vector memory read interface circuit can be configured to read data elements from a buffer having a memory access width equal to at least two data elements.

Certain embodiments relate to a microprocessor that can include a memory circuit and a merge sort functional unit. The memory circuit can be configured to store a data set having a plurality of data elements, wherein the data elements include respective sort keys. The merge sort functional unit can be coupled to the memory circuit and configured to execute a merge sort instruction on a data set loaded into the memory circuit. In some embodiments, the merge sort functional unit can include: a parallel merge sort core; a first input buffer; a second input buffer; a vector memory read interface circuit; a read control logic circuit; and a control interface. The parallel merge sort core can include a partial merge sort circuit having a first set of inputs to receive a first input tuple including at least two first data elements sorted according to a sort key and a second set of inputs to receive a second input tuple including at least two second data elements sorted according to the sort key, and the partial merge sort circuit can be configured to produce a sorted output tuple including at least two data elements selected from the first and second input tuples and sorted according to the sort key and a selection signal indicating which of the data elements of the first and second input tuples were selected. The first input buffer can be configured to store a plurality of data elements in order from a first data stream, to provide the first input tuple to the parallel merge sort core, and to discard one or more stored data elements in response to a first feedback signal from the parallel merge sort core. The second input buffer can be configured to store a plurality of data elements from a second data stream, to provide the second input tuple to the parallel merge sort core, and to discard one or more stored data elements in response to a second feedback signal from the parallel merge sort core. The vector memory read interface circuit can be configured to provide a first data stream corresponding to a first data block and a second data stream corresponding to a second data block. The read control logic circuit can be coupled to the first input buffer and the second input buffer and can be configured to control loading of data elements from the first data stream into the first input buffer and loading of data elements from the second data stream into the second input buffer based on respective fill levels of the first input buffer and the second input buffer. The control interface can be configured to coordinate operation of the read control logic circuit and the parallel merge sort core to execute a plurality of sorting rounds on the data set, wherein one or more of the sorting rounds includes using the parallel merge sort core to sort a pair of input data blocks to produce an output data block that includes the data elements in the pair of input data blocks.

In some embodiments, the parallel merge sort core can also include a first barrel shifter, a second barrel shifter, and a merge sort control logic circuit. The first barrel shifter can have a plurality of output paths coupled to the first set of inputs of the partial merge sort circuit and a plurality of input paths to receive the first input tuple from the first input buffer, and the first barrel shifter can be configured to apply a first cyclic shift to the first input tuple. The second barrel shifter can have a plurality of output paths coupled to the second set of inputs of the partial merge circuit and a plurality of input paths to receive the second input tuple from the second input buffer, and the second barrel shifter can be configured to apply a second cyclic shift to the second input tuple. The merge sort control logic circuit can be coupled to the first barrel shifter, the second barrel shifter, and the partial merge circuit, and the merge sort control logic circuit can be configured to determine the first cyclic shift and the second cyclic shift for a given operating cycle based at least in part on the selection signal generated during a previous operating cycle. In some embodiments, the merge sort control logic circuit can include a first element counter and a second element counter, and the merge sort control logic can be further configured to: increment the first element counter and the second element counter responsive to the selection signal; and generate control signals for the first barrel shifter and the second barrel shifter based on the first element counter and the second element counter. In some embodiments, the merge sort control logic circuit can be further configured to generate the first feedback signal for the first input buffer and the second feedback signal for the second input buffer based at least in part on the selection signal.

In some embodiments, a microprocessor can also include a memory having sufficient capacity to store the data elements in the data set and a vector memory write interface circuit configured to write a stream of the sorted output tuples to the memory, and the vector memory read interface circuit can be configured to obtain the first data stream and the second data stream from the memory. In some embodiments, the memory can include two buffers, each buffer having sufficient capacity to store the data elements in the data set, and the vector memory read interface circuit and the vector memory write interface circuit can be configured to alternatingly read and write to the two buffers during the plurality of sorting rounds. In some embodiments, the vector memory read interface circuit can be configured to determine respective starting addresses for reading the first data stream and the second data stream based on a round counter and a size of the data set being sorted and to determine subsequent starting addresses by incrementing the starting addresses linearly.

In some embodiments, the sort key can correspond to a sequential identifier of a data packet, and the data elements can further include pointers to memory locations where the data packets are stored.

In some embodiments, the merge sort instruction can include a bitmask identifying a subset of bits of the data elements as corresponding to the sort key.

In some embodiments, the read control logic block can also include: a presort circuit configured to receive a group of at least two unsorted data elements from the first data stream and to sort the elements into a block of at least two sorted data elements; a first multiplexer configured to selectably couple the output of the presort circuit or the first data stream to the first input buffer; and a second multiplexer configured to selectably couple the output of the presort circuit or the second data stream to the second input buffer.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
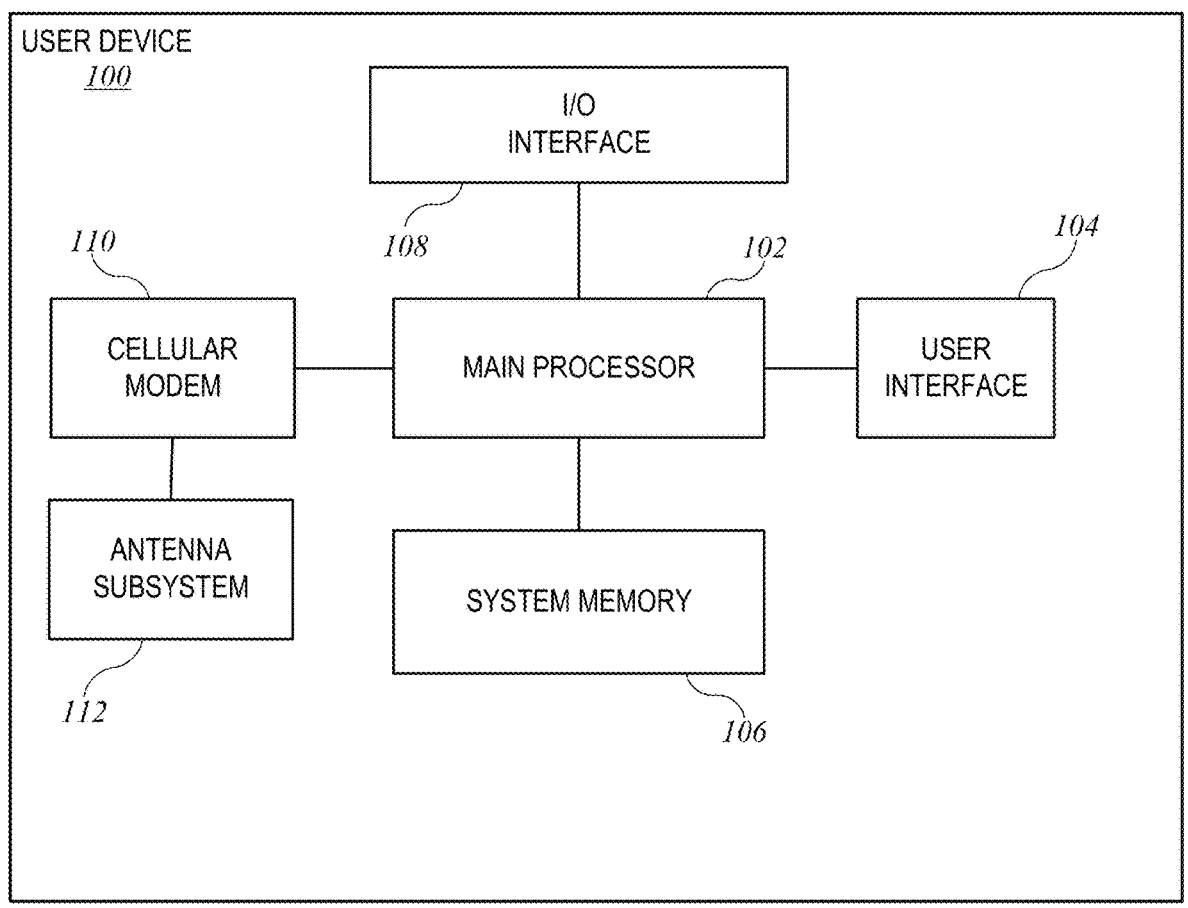
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio area network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. In some embodiments, cellular modem 110 can support cellular data communication according to standards promulgated by the 3rd Generation Partnership Project (3GPP) to enable radio-frequency communication between a base station (typically implemented at a cellular antenna tower) and various user equipment ("UE"), which can include user device 100, via an "uplink" from the UE to the base station and a "downlink" from the base station to the UE. Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels. At a high level, for any of these channels, data to be transmitted is encoded in the frequency domain, then transformed to time domain using an inverse Fast Fourier Transform (IFFT) for transmission on the radio channel; the receiver reverses the process by performing a Fast Fourier Transform (FFT) on the received time-domain signal, then decoding the data in the frequency domain. The particular encoding and decoding operations may differ from channel to channel and between 4G and 5G. Processing of digital signals or data packets can include sorting data according to some metric. For example, after decoding, received data packets may be sorted according to sequential packet identifiers.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
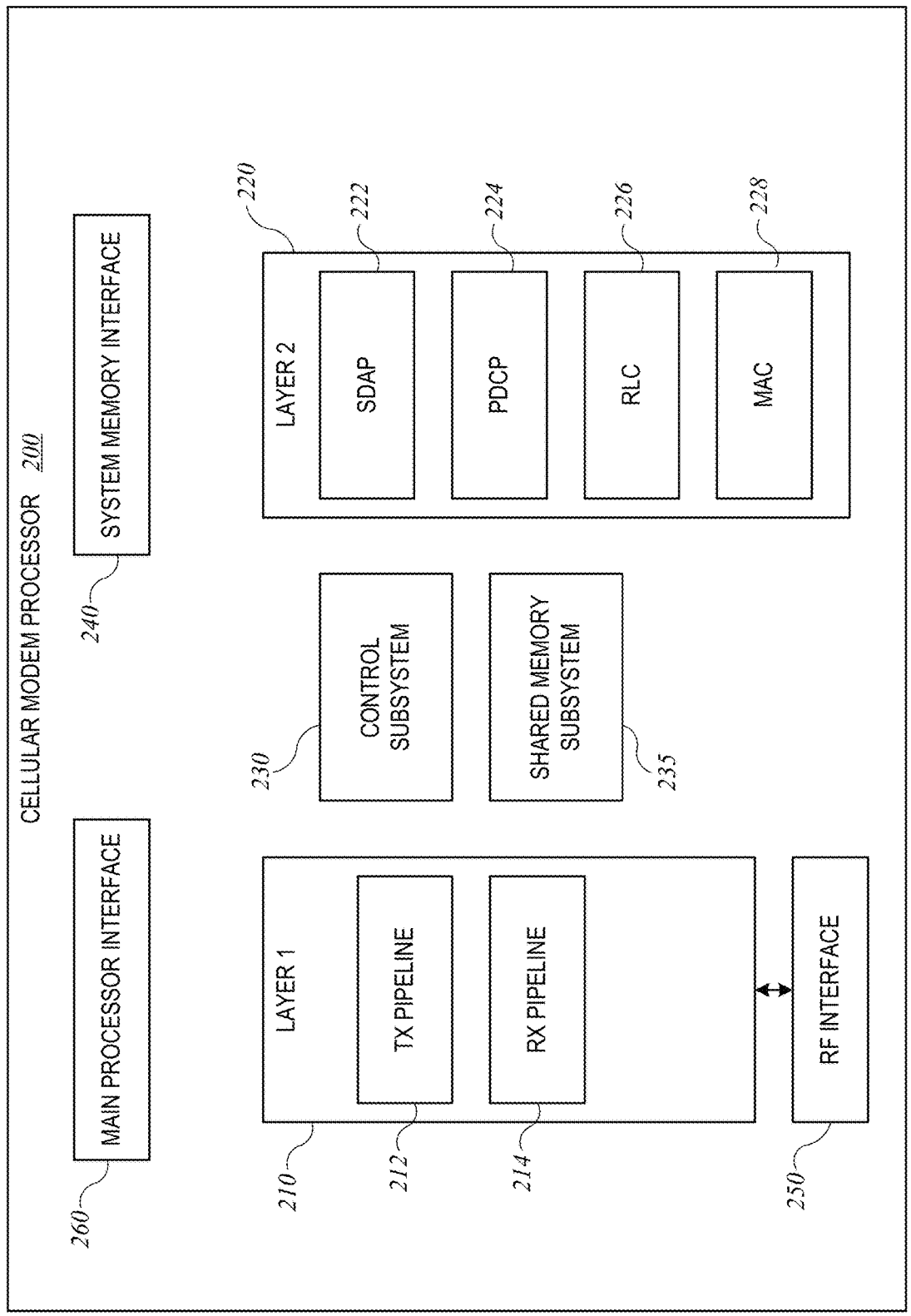
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Cellular modem processor 200 can include a "layer-1" processing section 210 that includes circuitry configured to perform operations associated with layer-1 (also referred to as the physical, or PHY, layer) of a 4G or 5G network protocol stack. For example, layer-1 processing section 210 can include one or more transmit (TX) pipelines 212 and one or more receive (RX) pipelines 214. Cellular modem processor 200 can also include a "layer-2" processing section 220 that includes circuitry configured to perform operations associated with layer-2 of a 4G or 5G network protocol stack. For example, layer-2 processing section 220 can include a service data adaptation (SDAP) module 222, a packet data convergence protocol (PDCP) module 224, a radio link control (RLC) module 226, and a medium access control (MAC) module 228. Cellular modem processor 200 can also include other components, such as a control subsystem 230, a shared memory subsystem 235, and various interfaces to other system components, such as a system memory interface 240, an RF interface 250, and a main processor interface 260.

Layer-1 processing section 210 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to the specifications for the PHY layer of a particular cellular data network, including 4G and/or 5G networks. For example, TX pipeline 212 can receive transport blocks containing data to be transmitted. TX pipeline 212 can perform a sequence of operations to prepare a transport block for RF transmission. For example, TX pipeline 212 can implement code block segmentation and channel coding for a particular channel (e.g., for PUCCH or PUSCH); interleaving and rate-matching operations on encoded code blocks; mapping of bit sequences from the interleaved and rate-matched code blocks onto symbols in an appropriate constellation for each of a set of orthogonal frequency division multiplexing (OFDM) subcarriers; and an inverse Fast Fourier Transform (IFFT) to transform the symbols to a sample sequence in the time domain. This sample sequence can be provided to RF interface 250.

RF interface 250 can be an interface to antenna subsystem 112 of FIG. 1 and can convert the sample sequence to an analog signal that is mixed onto the carrier frequency and transmitted via an antenna. RF interface 250 can also down-convert received RF signals to baseband and convert the baseband analog signal to a sequence of digital samples. Digital sample sequences can be provided to RX pipeline 214. As with TX pipeline 212, RX pipeline 214 can implement operations conforming to the specifications for the PHY layer of a particular cellular data network, including 4G and/or 5G networks. For example, RX pipeline 214 can receive a sequence of digital data samples from RF interface 250. RX pipeline 214 can perform a sequence of operations to reconstruct transport blocks from the digital data samples. For example, RX pipeline 214 can implement a Fast Fourier Transform (FFT) to transform the samples from time domain to frequency domain; demapping and soft decoding operations to produce log likelihood ratios (LLRs) or other estimates of the relative probability of a given bit being 0 or 1; de-interleaving and rate recovery operations on the LLRs; and channel decoding operations to decode the code blocks and reconstruct the transport blocks. It should be understood that the operations implemented in TX pipeline 212 and RX pipeline 214 can be specific to a particular channel and/or a particular communication standard. In various embodiments, dedicated hardware pipelines can be provided to support different physical channels (e.g., PDSCH vs. PDCCH) and/or different communication standards (e.g., 4G vs. 5G), or multipurpose pipelines that share hardware can be provided.

Layer-2 processing section 220 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to specifications for various sub-layers associated with layer 2 of the protocol stack of a particular cellular data network, including 4G and/or 5G networks. These operations can convert between packets (such as TCP/IP packets) generated or consumed at higher protocol layers (which can be implemented within cellular modem processor 200 or externally to cellular modem processor 200) and transport blocks processed by layer-1 processing section 220. For instance, SDAP module 222 can implement a quality of service (QoS) framework as specified in 5G network standards. For data being transmitted, PDCP module 224 can prepare packet data units (PDU); operations can include header compression, assignment of packet sequence numbers, and security features such as enciphering and/or integrity protection. RLC module 226 can perform additional segmentation of packets based on channel conditions, which may result in additional sequence numbers being assigned. MAC module 228 can multiplex data streams from multiple logical channels and generate transport blocks for processing by TX pipeline 212 in layer-1 processing section 210. For received transport blocks that have been decoded e.g., using RX pipeline 214, MAC module 228 can extract packets and associate the packets with appropriate logical channels. RLC module 226 can de-segment the packets, reversing any segmentation operations applied at the transmitter. PDCP module 224 can perform operations such as reordering of packets according to packet sequence numbers, deciphering, integrity checks, and the like.

Operation of layer-1 processing section 210 and layer-2 processing section 220 can be coordinated by control subsystem 230. Control subsystem 230 can include circuitry to manage communication between layer-1 processing section 210, layer-2 processing section 220, and other components of cellular modem processor 200 (e.g., RF interface 250, main processor interface 260, and system memory interface 240) and/or between cellular modem processor 200 and other components of a device or system (e.g., user device 100 of FIG. 1) in which cellular modem processor 200 operates. A variety of implementations can be used, including various combinations of fixed-function circuitry and programmable circuitry executing program code provided as firmware. Shared memory subsystem 235 can include memory circuits (e.g., SRAM, DRAM, or the like), a read interface and a write interface connected via crossbars to layer-1 processing section 210 and layer-2 processing section 220 (or to individual units within layer-1 processing section 210 and/or layer-2 processing section 220), and arbitration logic to manage multiple requests (e.g., using time division multiplexing or other techniques). In some embodiments, shared memory subsystem 235 can be implemented such that any unit in layer-1 processing section 210 or layer-2 processing section 220 can access any location in the shared memory. A variety of architectures, including conventional architectures, can be used. In some embodiments, shared memory subsystem 235 can be used to transfer data into and out layer-1 processing section 210 and/or layer-2 processing section 220, or between units within layer-1 processing section 210 and/or layer-2 processing section 220

Main processor interface 260 can enable communicating with main processor 102 (shown in FIG. 1), via an interface such as Advanced eXtensible Interface (AXI), which is part of ARM Advanced Microcontroller Bus Architecture, or any other suitable interface for communication between a main processor and a coprocessor. Other interfaces to other components of user device 100 can also be provided, such as a system memory interface 240 that provides a direct memory access (DMA) interface to transfer data between shared memory subsystem 235 and system memory 106 of FIG. 1.

It will be appreciated that cellular modem processor 200 is illustrative and that variations and modifications are possible. A cellular modem processor can include any number and combination of processing modules and pipelines, supporting any number and combination of cellular data communication standards. Control subsystems, memory subsystems and interfaces to other components can be varied as desired. In some embodiments, cellular modem processor 200 can have a high throughput to support high-speed cellular networks (e.g., 12 Gbps for a 5G network).

In some embodiments, some or all of the data processing pipelines (e.g., pipelines in layer-1 processing section 210 and/or layer-2 processing section 220, as well as any other pipelines in cellular modem processor 200) can be single-instruction, multiple-data (SIMD) pipelines (also referred to as vector pipelines), which can increase throughput by processing data in a number (L) of parallel lanes. Pipelines can perform various digital signal processing operations, which can include sorting of a set of data elements. For example, it may be desirable to sort a set of data elements according to some metric (which can be, e.g., largest or smallest numeric values, depending on how the metric and the sort operation are defined).

Certain embodiments relate to parallel merge sort circuits that can be used to accelerate merge sort operations. In the context of cellular modem processor 200, merge sorting may be used, for example, after a set of data packets have been received and decoded. For example, in high-speed data networks such as 4G and 5G networks, data packets may be generated in a sequential order but received in a different order. In some embodiments, each packet can include a sequential numeric identifier indicating its sequential order, and PDCP module 224 in layer-2 processing section 220 can use merge sorting to sort packets into sequential order based on the sequential numeric identifiers. In some embodiments, PDCP module 224 can include a parallel merge sort circuit of the kind described below to perform sorting of data packets. While PDCP module 224 provides one example where a parallel merge sort circuit can be advantageously used, it should be understood that parallel merge sort circuits of the kind described herein can be used in any context where merge sorting is implemented.

For purposes of the present description, it is assumed that the parallel merge sort circuit operates on a set of data elements. Each data element can include a sort key, also referred to as a "metric," which can be a quantity or attribute according to which the data elements are being sorted. For example, in some embodiments where data packets are being sorted (e.g., in PDCP module 224 as described above), a sort key can be formed by combining (e.g., concatenating) sequence numbers of packets at the RLC and PDCP layers. A variety of sort keys can be used, provided that the sort key has a set of different possible values and that those different possible values can be ordered from "lowest" to "highest." In some embodiments, the sort key can have a numerical value, and the ordering can be based on comparing numerical values. In examples used herein, it is assumed that it is desired to sort the data elements according to ascending sort-key values (e.g., 1, 2, 3, 4, . . . ); however, circuits of the kind described herein can be used to sort data elements according to descending sort-key values (9, 8, 7, 6, . . . ). It will be appreciated that a variety of properties can be defined as a sort key, with a sequential packet identifier being just one example. While comparing numerical values can facilitate implementation of sorting operations described herein, it should be understood that sorting can be implemented for any type of metric, provided that suitable logic circuits can be configured to compare two metrics and determine which is lower (or higher).

In some embodiments, each data element can include other information in addition to the sort key. For instance, in the case where data packets are being sorted (e.g., in PDCP module 224 as described above), each data element can include the sort key and a pointer or other reference to a memory location (e.g., in shared memory subsystem 235 or some other memory location) where the corresponding data packet is stored. While a pointer is used herein as an example, it should be understood that a data element can include any type and amount of information in addition to the sort key. In embodiments described below, it is assumed that each data element has a fixed length (e.g., 32 bits, 64 bits, or the like) and that a subset of the bits can be designated as representing the sort key. For instance, the sort key can be defined by providing a bitmask that indicates which bits correspond to the sort key. Sorting operations can be based on comparing the sort keys, ignoring other bits, while all bits of the data element travel through the sort circuit (e.g., on parallel signal paths). In some embodiments, to simplify the circuitry, the sort key can be limited to a shorter length than the data element (e.g., up to 8-bit sort key for a 32-bit data element, up to 32-bit sort key for a 64-bit data element), and the sort key can be positioned, e.g., at the left or right end of the data element. Other implementations are also possible.

"Merge sort" refers to a sort operation that proceeds through a series of rounds (or stages) to sort a data set of length L (i.e., a data set containing L data elements, where L can be any positive integer) according to a sort key. At each round, the data set can be divided into sorted input blocks having a nominal length of $2^R$ data elements, where R is a round counter that begins at 0 (block length 1) and ends when $2^R \geq L$. Where the data set does not divide equally into input blocks of length $2^R$, one (or more) of the input blocks can have a shorter length and can be padded to length $2^R$ using "dummy" elements. Pairs of input blocks (sometimes referred to as "block A" and "block B") can be merged to produce a single sorted block of length $2^{R+1}$. For example, in a scalar implementation of merge sort, each input block can be loaded into a FIFO. The leading elements of input blocks A and B (or the first element in each FIFO) can be compared, and the element with the lower sort key (assuming an ascending sort) can be popped from its FIFO and placed into the next position in the sorted block. This operation can be repeated until all elements from both input blocks have been placed into the sorted block. At the next stage, pairs of sorted blocks of length $2^{R+1}$ can be merged in the same manner to produce longer blocks, until all of the data is in a single sorted block.

A scalar implementation of merge sort produces output data elements at a peak rate of one per clock cycle, which may not be fast enough to support the throughput requirements of 5G networks or other high-rate data processing. Accordingly, parallel implementations of merge sort, which can provide higher throughput, are desirable. Examples of parallel merge sort circuits will now be described. In some embodiments, circuits of the kind described can support data throughput of 16 Gb/sec, matching or exceeding 5G network specifications.

Figure 3:
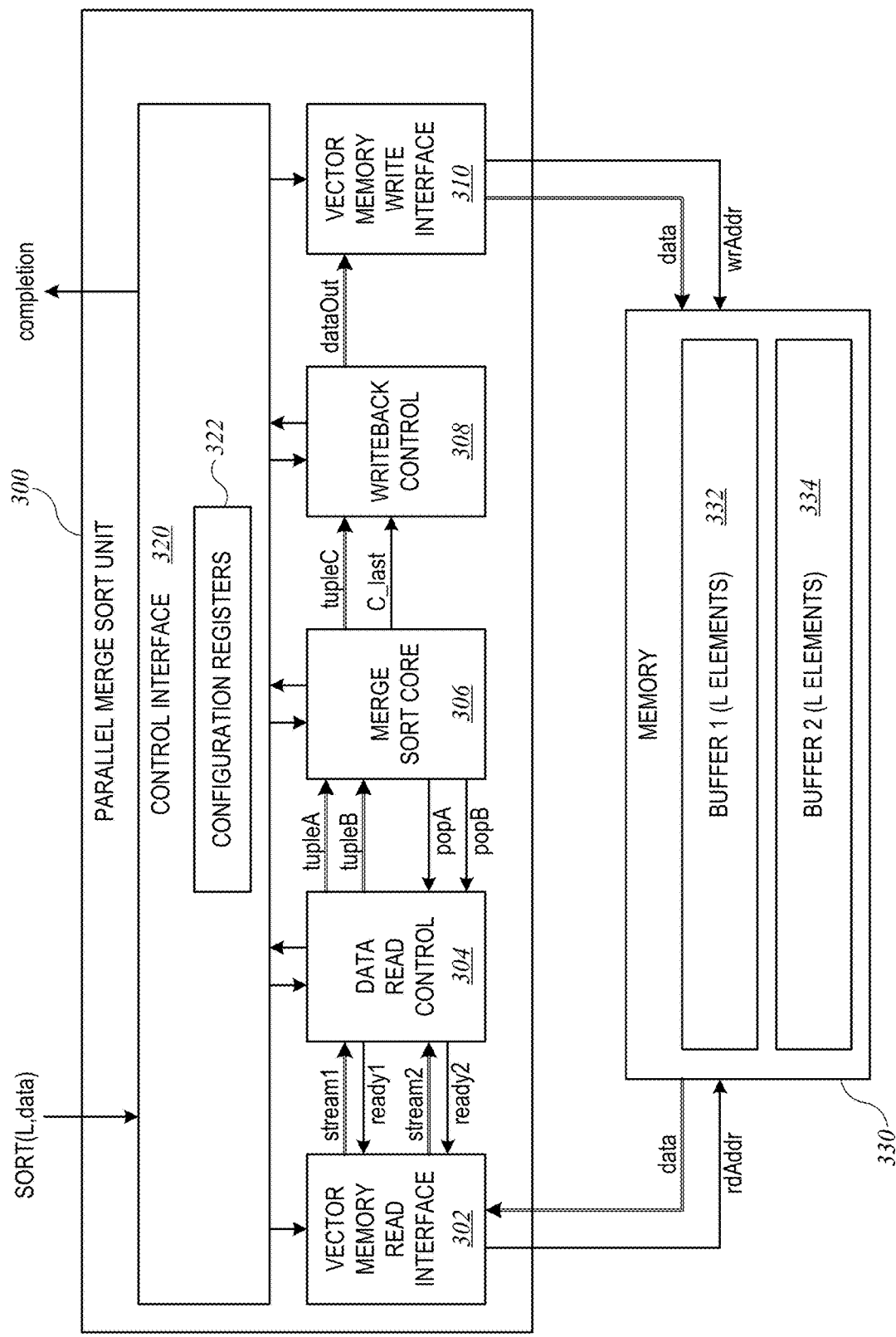
FIG. 3 shows a simplified high-level block diagram of a parallel merge sort unit according to some embodiments.

FIG. 3 shows a simplified high-level block diagram of a parallel merge sort unit 300 according to some embodiments. Parallel merge sort unit 300 can include various processing engines such as a vector memory read interface 302, a data read control block 304, a merge sort core 306, a writeback control block 308, and a vector memory write interface 310, operating under control of a top-level control interface 320. The data set to be sorted can be stored in a memory 330 that is accessible to parallel merge sort unit 300.

Memory 330 can implemented using any type of addressable memory device or circuit.

In some embodiments, memory 330 can be a dedicated memory that is used only by merge sort unit 300; in other embodiments, memory 330 can be a shared memory that is also accessed by other processing units or pipelines. In some embodiments, two buffers 332, 334 can be allocated within memory 330, with each buffer 332, 334 being large enough to store the entire data set being sorted. For example, data elements can have a fixed size such as 32 bits or 64 bits, and a maximum number of data elements in a data set to be sorted can be selected as a matter of design choice for a particular application. For instance, in some applications for sorting 5G data packets, support for sorting of up to 1024 data elements may be desirable, and the size of buffers 332, 334 can be 1024*64 bits. Different buffer sizes can also be used. In embodiments described herein, buffers 332 and 334 are used in a ping-pong fashion during the merge sort. For instance, during initialization of merge sort unit 300, the data set can be loaded to buffer 332. In the first stage of sorting, input data blocks can be read from buffer 332 while merged data blocks are written to buffer 334. In the second stage of sorting, input data blocks can be read from buffer 334 while merged data blocks are written to buffer 332, and so on. Depending on the number of sorting rounds (which depends on the number of data elements in the data set), the final sorted data set may be written to either buffer 332 or buffer 334.

Merge sort core 306 can implement a P-way parallel partial merge sort operation, where P is a degree of parallelism. In various embodiments, P can be 2, 4, or any other integer greater than 1. Selection of P is a matter of design choice and can be based on the desired throughput, size of data elements, and other considerations. For instance, in digital circuit implementations, selecting P to be a power of 2 can simplify various aspects of circuit design. In some examples described herein, P=4 is used. In each operating cycle, merge sort core 306 receives a first ordered set of P data elements (referred to herein as a "tuple") from a first (sorted) first data block ("tuple A") and a second tuple of P sorted data elements from a second (sorted) data block ("tuple B") and outputs a sorted tuple ('tuple C") of P sorted data elements. Example implementations of merge sort core 306 are described below. In some embodiments, merge sort core 306 can be a pipelined circuit, and the output tuple C for a given pair of input tuples A and B can be produced some (fixed) number of clock cycles after receiving the input tuples, with the pipeline producing one output tuple per clock cycle. Through repeated operation of merge sort core 306, the sorting rounds of a merge sort operation can be performed.

Data read control block 304 can provide input data tuples (A and B) to merge sort core 306. As described below, data read control block 304 can include a block buffer (e.g., a FIFO) for each of the two input data blocks that are being merged and control logic to monitor the fill levels of the block buffers and generate requests to vector memory read interface 302 for additional data based on the fill levels of the block buffers. In various embodiments, the block buffers can be large enough to store n*P data elements for integer n>1. As will become apparent, the block buffers need not be large enough to store the largest possible input data block for a given data set size. In some embodiments, the block buffer size can be large enough to account for memory access latency, and data requests can be made at appropriate times such that at least P values are available in each block buffer during each cycle of a merge operation for two input data blocks.

Vector memory read interface 302 can read data elements from memory 330. In some embodiments, memory 330 can provide a fixed-width access (e.g., 256, 512, or 1024 bits) that is at least P data elements wide, so that a single read request to memory 330 can retrieve at least P data elements. In examples described herein, it is assumed that a given read request reads all or part of the data for one or the other input block (block A or block B) that is being merged. Vector memory read interface 302 can include address generation circuitry to generate an address for each memory read operation based on the current sorting round, the length of the data set, and whether data read control block 304 has requested data for block A or block B. For instance, vector memory read interface 302 can select an input buffer (e.g., either buffer 332 or buffer 334) based on the sorting round and generate an address offset for each read request. The address offset may be based on the block size for the current sorting round and the length of the data set. In some embodiments, the memory access width can be greater than P data elements, and vector memory read interface 302 can include a stream buffer for block A ("stream 1") and a separate stream buffer for block B ("stream 2") to hold retrieved elements until data read control block 304 signals that it is ready to receive the data elements. Vector memory read interface 302 can also include additional logic to handle instances where the data read from memory does not align with the block boundaries of a given sorting round; such logic can include holding back data elements that are not part of an input block currently being merged and/or adding dummy elements if an input data block has fewer elements than the nominal input block size of the current sorting round. Examples are described below.

Writeback control block 308 can receive sorted output tuples (tuple C) from merge sort core 306 and prepare the output for writing to memory. Each output tuple can include P data elements that were selected and sorted by merge sort core 306. In some embodiments, writeback control block 308 can concatenate tuples across multiple clock cycles to generate a data word that matches the memory access width and can provide that data word to vector memory write interface 310. Writeback control block 308 can also perform other operations, such as discarding dummy elements. In some embodiments, writeback control block 308 can generate a "C_last" signal indicating when the output data word represents the end of a sorting round, in which case the data word may be shorter than the memory access width.

Vector memory write interface 310 can write data words to memory 330. As described above, memory 330 can provide a fixed-width access (e.g., 256, 512, or 1024 bits) that is at least P data elements wide, and a single write operation can write at least P data elements. Vector memory write interface 310 can include address generation circuitry to generate an address for each memory write operation based on the current sorting round and the particular data word. In some embodiments, vector memory write interface 310 can write data words successively to contiguous locations in the output buffer for the current round (either buffer 332 or 334, depending on the round) without consideration of block boundaries. Examples are described below.

Top-level control interface 320 can coordinate operations of the various processing engines of parallel merge sort unit 300. For example, top-level control interface 320 can receive a merge sort instruction and control the various processing engines to execute a merge sort operation based on the merge sort instruction. The merge sort instruction can specify various parameters, such as the length L of the data set to be sorted, a location where the data set is stored, and a bit mask or other information indicating which portion (e.g., which bits) of each data element should be used as the sort key. These parameters and other parameters related to the configuration and status of the sort operation can be stored in configuration registers 322. As an example of status information, top-level control interface 320 can maintain a round counter that is provided to the various processing engines. Top-level control interface 320 can determine when sorting for a round is completed and increment the round counter. Operation of top-level control interface 320 is further described below.

Figure 4:
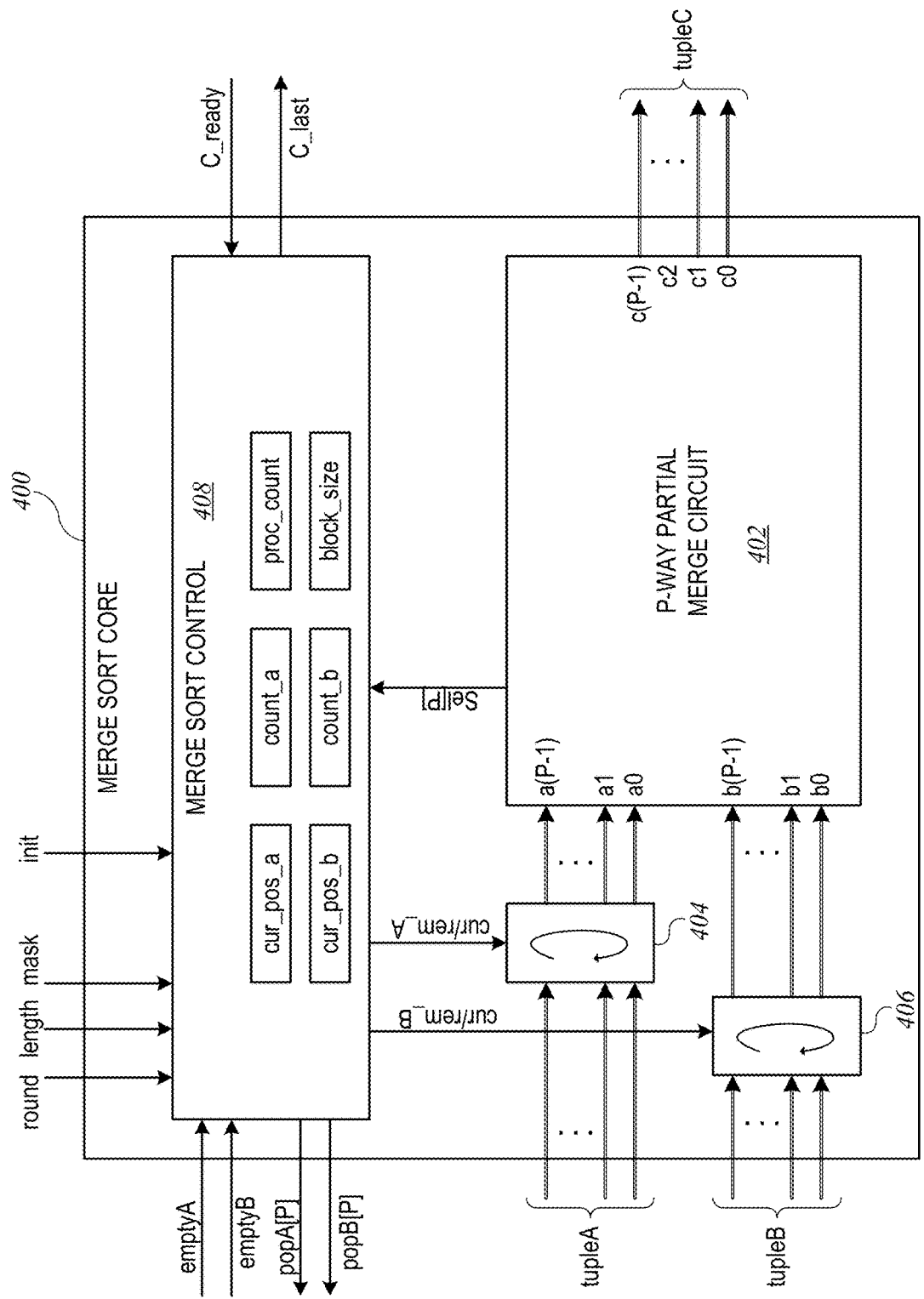
FIG. 4 shows a simplified block diagram of a merge sort core according to some embodiments.

Example implementations of processing engines within parallel merge sort unit 300 will now be described. FIG. 4 shows a simplified block diagram of a merge sort core 400 according to some embodiments. Merge sort core 400 can be used to implement merge sort core 306 of FIG. 3. Merge sort core 400 includes a P-way partial merge circuit 402, two barrel shifters 404, 406, and a merge sort control logic circuit 408.

Figure 5A:
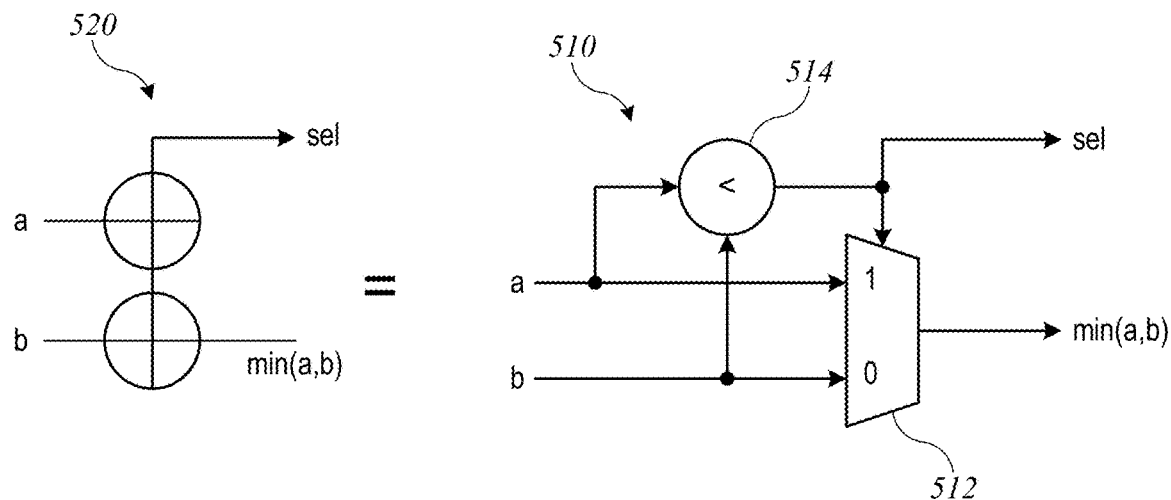
FIG. 5A shows a simplified schematic diagram of a compare-and-select circuit that can be used in some embodiments.

In some embodiments, P-way partial merge circuit 402 can be implemented as a bitonic partial merge circuit using a network of compare-and-select and compare-and-exchange circuits. FIG. 5A shows a simplified schematic diagram of a compare-and-select circuit 510 that can be used in some embodiments. Circuit 510 includes a multiplexer 512 and a comparator 514, each coupled to two input paths (labeled "a" and "b") In operation, each input path receives a data element. Comparator 514 compares the two data elements. In some embodiments, comparator 514 can be configured to apply a bit mask and compare the bits selected by the bitmask (which can correspond to the sort key), ignoring the rest of the data element. In this example, comparator 514 outputs a selection signal ("sel") that is set to logical "1" if the sort key of element a is lower than sort key of element b and to logical "0" otherwise. Accordingly, multiplexer 514 outputs the element (a or b) that has the smaller sort key. The selection signal is also output, providing feedback as to which element was selected. Circuit symbol 520 is used in subsequent drawings to represent a compare-and-select circuit such as circuit 510.

Figure 5B:
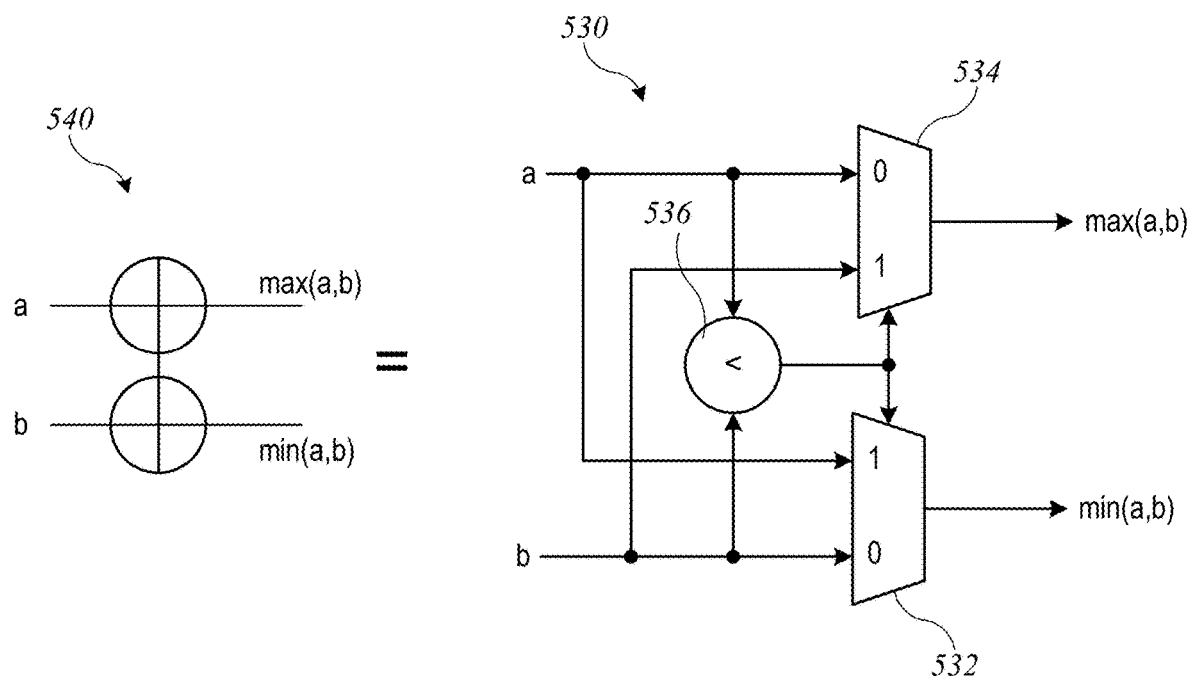
FIG. 5B shows a simplified schematic diagram of a compare-and-exchange circuit that can be used in some embodiments.

FIG. 5B shows a simplified schematic diagram of a compare-and-exchange circuit 530 that can be used in some embodiments. Circuit 530 includes two multiplexers 532, 534 and a comparator 536, each coupled to two input paths (labeled "a" and "b") In operation, each input path receives a data element. Comparator 536, which can be similar or identical to comparator 514, outputs a selection signal outputs a selection signal ("sel") that is set to logical "1" if the sort key of element a is lower than sort key of element b and to logical "0" otherwise. Accordingly, multiplexer 532 outputs the element (a or b) that has the lower sort key, and multiplexer 534 outputs the element (a or b) that has the larger sort key. Circuit symbol 540 is used in subsequent drawings to represent a compare-and-exchange circuit such as circuit 530.

Figure 6:
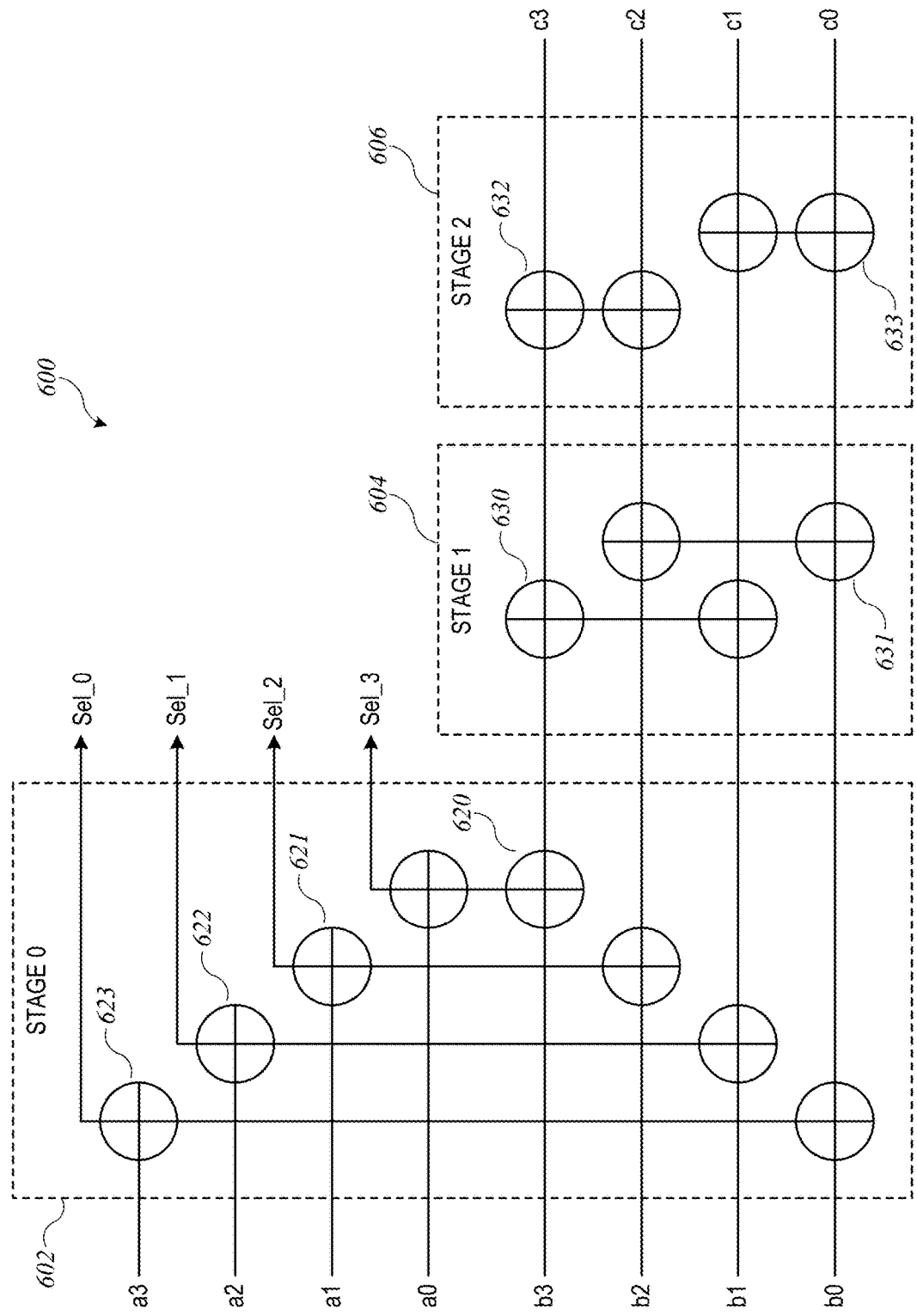
FIG. 6 shows a simplified schematic diagram of a bitonic 4-way partial merge circuit that can be used in some embodiments.

FIG. 6 shows a simplified schematic diagram of a bitonic 4-way partial merge circuit 600 that can be used in some embodiments. In some embodiments where P=4, circuit 600 can be used to implement P-way partial merge circuit 402 of FIG. 4. Circuit 600 includes three stages 602, 604, 606. Stage 602 includes four compare-and-select circuits 620-623. Each compare-and-select circuit 620-623 receives one element (a0-a3) from a first tuple and one data element (b0-b3) from a second tuple. For an ascending sort, each compare-and-select circuit 620-623 selects the data element with the lower sort key as output to subsequent stages and provides four selection signals (Sel_0, Sel_1, Sel_2, Sel_3) indicating whether the corresponding selection was from the first or second tuple. Subsequent stages 604, 606 sort the selected elements using compare-and-exchange circuits 630-633. The output data elements (c0-c3) are a sorted tuple. Provided that the first input tuple (a0-a3) and the second input tuple (b0-b3) are each in sorted order, circuit 600 selects the four elements with the lowest sort keys and sorts them. It should be noted that the P elements selected at stage 602 can include any number (from 0 to P) of data elements from either input tuple. Circuit 600 is an example of a P-way partial merge circuit; it will be appreciated that circuits similar to circuit 600 can be constructed for different values of P and that other circuits that produce a sorted tuple of size P from two input tuples of size P can also be used.

Referring again to FIG. 4, P-way partial merge circuit 402 (which can be, e.g., circuit 600 or a similar circuit) receives two sorted tuples as inputs. Barrel shifters 404, 406 can provide the tuples in sorted order. For example, barrel shifters 404, 406 can be implemented using conventional barrel shifter circuits that apply a cyclic permutation to the inputs, with the particular permutation being determined by a control signal indicating the number of positions (0 to P−1) by which the inputs should be shifted.

Merge sort control logic 408 can control operation of barrel shifters 404, 406 based on the selection signals provided by P-way partial merge circuit 402. For example, while a pair of blocks A and B is being sorted, merge sort control logic 408 can maintain a first counter (count_a) of the number of elements from block A that have been selected and a second counter (count_b) of the number of elements from block B that have been selected. Each time P-way partial merge circuit 402 operates, merge sort control logic 408 can receive the selection signals (sel[P]) indicating which elements were selected and can increment counters count_a and count_b accordingly. In some embodiments, merge sort control logic 408 can also maintain a count (proc_count) of the total number of elements sorted. In some embodiments, control signals for the barrel shifters can be generated based on the counters. For instance, the control signals cur_pos_a and cur_pos_b can be computed as (count_a mod P) and (count_b mod P), where "mod" is the modulo operator.

In addition, merge sort control logic 408 can provide feedback signals to data read control unit 304. For example, merge sort control logic 408 can provide "pop" signals indicating which elements from tuple A and which elements from tuple B were selected by P-way partial merge circuit 402. Data read control unit 304 can use this information to manage its buffers, as described below.

Merge sort control logic 408 can also provide a "C_last" signal to writeback control unit 308, indicating when the end of a pair of blocks has been reached. For example, merge sort control logic 408 can determine the block size for the current sorting round, e.g., according to the rule that the block size is $2^R$, where R is the round counter value provided by top-level control interface 320. (Other rules can also be used.) Based on the element counters (proc_count, count_a, count_b) and the block size, merge sort control logic 408 can determine when all elements of both input blocks have been sorted and generate the C_last signal accordingly.

Figure 7:
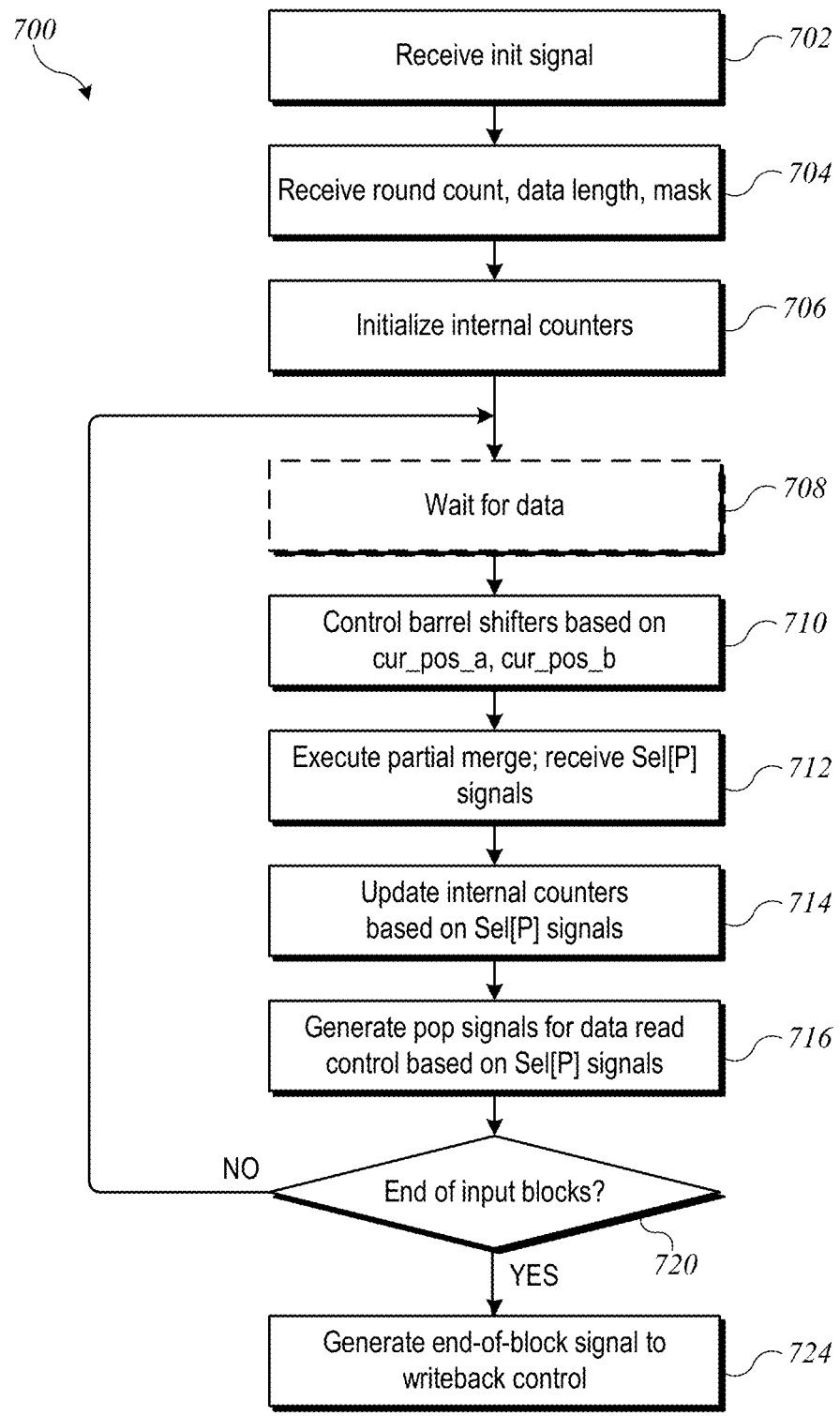
FIG. 7 shows a flow diagram of a process that can be implemented in a merge sort control logic circuit according to some embodiments.

FIG. 7 shows a flow diagram of a process 700 that can be implemented in merge sort control logic 408 according to some embodiments. Process 700 can implement the logic for performing a merge operation on a pair of sorted input blocks A and B.

Process 700 can begin with initialization. For instance, at block 702, merge sort control logic 408 can receive an initialization signal (init), e.g., from top-level control interface 320. At block 704, responsive to the initialization signal, merge sort control logic 408 can receive or obtain the current round counter value (R), the length (L) of the data set being sorted, and a bit mask or other information identifying the location of the sort key within each data element. In some embodiments, top-level control interface 320 can store this information in registers 322 and merge sort control logic 408 can read registers 322; in other embodiments, dedicated signal paths can be provided to deliver the information to merge sort control logic 408. At block 706, merge sort control logic can initialize its internal counters. For example, count_a, count_b, and proc_count can be initialized to zero. The block size can be set based on the round counter (e.g., block_size=$2^R$).

Following initialization, merge sort control logic 408 can execute a loop to sort a pair of input data blocks. At block 708, process 700 can wait for data tuples A and B to be ready. For example, merge sort control logic 408 can receive "emptyA" and "emptyB" signals from data read control unit 304; these signals can indicate whether data is available. As described below, data read control unit 304 can be operated to optimize data availability and reduce the time process 700 spends waiting for data.

At block 710, merge sort control logic 408 can send control signals to barrel shifters 404, 406 to deliver the cyclically shifted data tuples to P-way partial merge circuit 402. For instance, as described above, shift amounts cur_pos_a and cur_pos_b can be computed from count_a and count_b (the computation can be as simple as retaining least significant bits), and corresponding control signals can be sent to barrel shifters 404, 406. At block 712, P-way partial merge circuit 402 can execute a merge operation and provide selection (Sel[P]) signals to merge sort control logic 408. At block 714, merge sort control logic 408 can update its internal counters based on the selection signals, e.g., as described above. At block 716, merge sort control logic 408 can generate pop signals to data read control unit 304 based on the selection signals, e.g., indicating which elements of each tuple were selected, so that data read control unit 304 can update the tuples appropriately for the next iteration.

At block 720, merge sort control logic 408 can determine whether the end of the pair of input blocks has been reached. For example, merge sort control logic 408 can compare the block size to the count of processed elements. If the end of the blocks has been reached, then at block 724, merge sort control logic 408 can generate an end-of-block signal (e.g., the C_last signal) to writeback control unit 308.

Process 700 can be executed to merge one pair of input blocks. Process 700 can be repeated for each pair of input blocks in each sorting round to complete a merge sort for a data set of arbitrary length. As this example illustrates, the merge sort control logic can be simple and independent of the particular block size or sorting round. Merge sort control logic 408 can be implemented using dedicated logic circuits to facilitate high throughput.

As noted, throughput can depend on availability of input tuples. In some embodiments, data read control unit 304 can maintain a block buffer for each input block so that input tuples are available on each cycle while merging of the two blocks is in progress.

Figure 8:
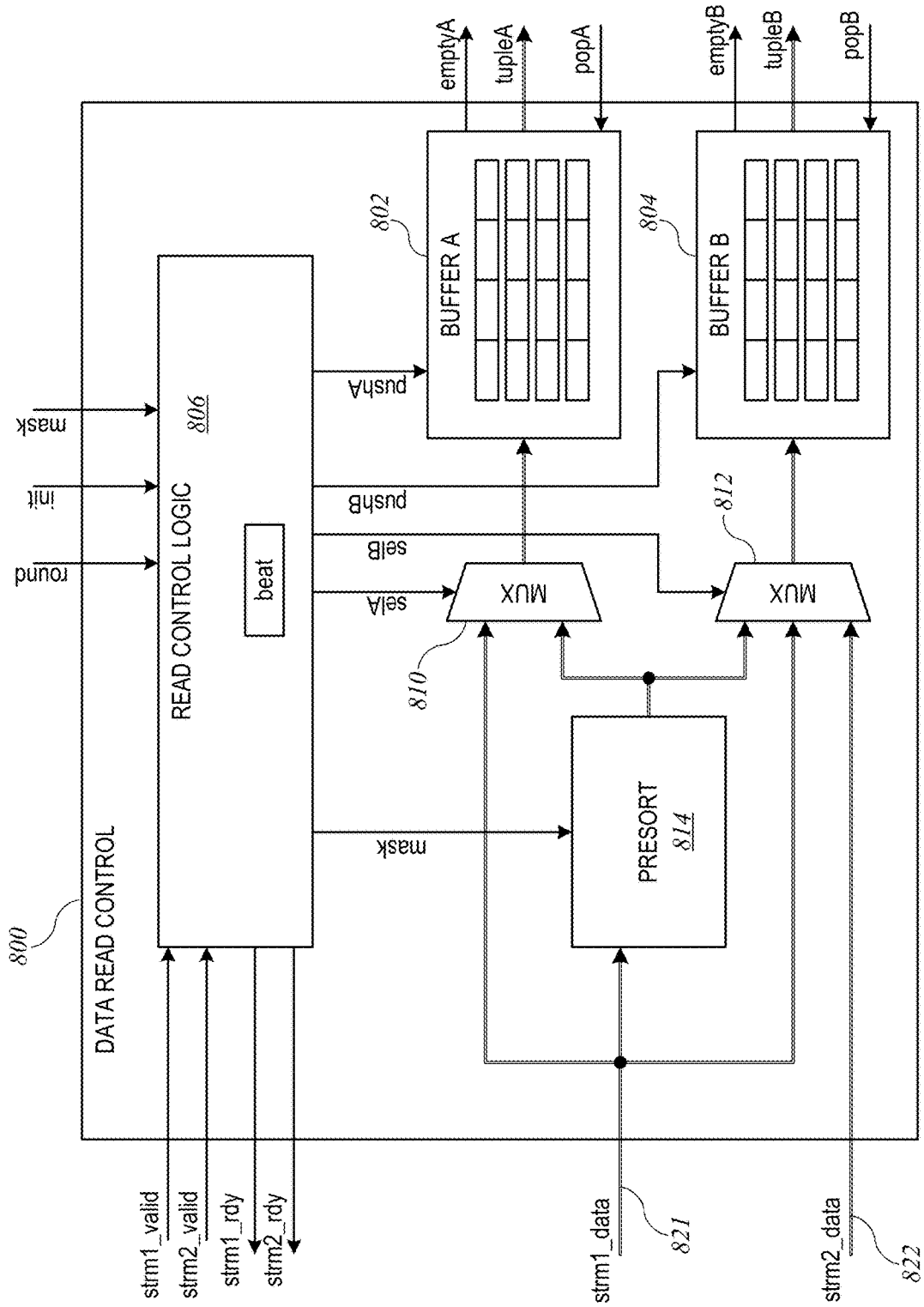
FIG. 8 shows a simplified block diagram of a data read control unit according to some embodiments.

FIG. 8 shows a simplified block diagram of a data read control unit 800 according to some embodiments. Data read control unit 800 can be used to implement data read control unit 304 of FIG. 3. Data read control unit 800 can include two block buffers 802, 804, and a read control logic circuit 806. In some embodiments, data read control unit 800 can also include a presort circuit 814 and multiplexers 810, 812, that can be used to accelerate the initial rounds of merge sorting as described below.

Block buffers 802 and 804 can provide tuple A and tuple B, respectively, to merge sort core 306. In some embodiments, each block buffer 802, 804 can include one or more FIFOs. On each clock cycle, each block buffer 802, 804 outputs a tuple of values.

Each block buffer 802, 804 can be implemented using a fixed-size storage element such as a FIFO, having the capacity to store some number of data elements. In various embodiments, the storage capacity of each block buffer 802, 804 can be 2P elements, 4P elements, 8P elements, or n*13 elements, for integer n>1. It should be understood that, for some sorting rounds, the size of the input blocks can exceed the size of block buffers 802, 804. The size can be selected to account for memory latency so that during merging of a pair of input blocks, each block buffer 802, 804 can be expected to contain at least P elements unless the end of an input block has been reached. An optimal size for block buffers 802, 804 may also depend on the size of the data elements to be handled; for instance, given a fixed buffer size, the probability of underflow increases with increasing size of the data elements. Each block buffer 802, 804 receives a separate data stream (corresponding to block A and block B, respectively), and stores data elements in the order received. At each operating cycle, the P oldest elements in each block buffer 802, 804 are provided as tupleA and tupleB respectively. An element can remain in block buffer 802 or 804 until a pop signal from merge sort core 306 indicates that the element has been selected for merging, at which point the selected element can be removed. It should be understood that, in a given operating cycle, a total of P elements are selected from block buffers 802 and 804, with 0 to P elements selected from block buffer 802 and P to 0 elements selected from block buffer 804. Read control logic circuit 806 can monitor the fill level of each buffer 802, 804, and generate a push signal to allow new data elements to be latched into the buffer based on the fill level. In various embodiments, the push signal for a particular block buffer 802, 804 is generated when enough elements have been removed that the block buffer can accept a new group of P data elements, or when enough elements have been removed that the block buffer can accept a new group of data elements corresponding to a memory read request. As long as each block buffer 802, 804 receives data elements in sorted order, block buffers 802, 804 can provide ordered tuples of data elements to merge sort core 306.

In some embodiments, block buffer 802 (or block buffer 804) can be implemented using a group of P FIFO circuits. Each group of P elements can be loaded in parallel, with one element pushed into each FIFO. The first element in the group (which in the case of ascending sort has the lowest sort key within the group) is placed in the first FIFO, next into the second FIFO, and so on. This eliminates the need for a shifter or crossbar at the input to the block buffer. The tuple can be provided to merge sort core 306 by reading the oldest element in each FIFO. Merge sort core 306 (which can be implemented using merge sort core 400 described above) can perform a partial merge operation on the tuples from buffers 802 and 804 and provide pop signals indicating which tuple positions were selected in the merge. The FIFOs corresponding to the tuple positions that were selected can be advanced, moving the next element into the read position. In this configuration, the tuple provided at each cycle includes the lowest-ranking P elements in the input data block (which, in an ascending sort, have the lowest remaining sort keys); however, the lowest-ranking element is not necessarily in the first FIFO because one or more of the FIFOs may have advanced. The position of the oldest element depends on how many elements of the input block have already been selected in merge sort core 306; if that number is not an integer multiple of P, the lowest-ranking element may be in a FIFO other than the first. As described above, merge sort core 306 can track the number of elements that have been selected from each input block and apply the appropriate cyclic permutation (e.g., using barrel shifters 404, 406) so that the lowest-ranking element of each tuple is in the first position (e.g., a0 or b0 in FIG. 6) at the inputs to P-way partial merge circuit 402. Other implementations are also possible. For example, each buffer can be a single FIFO, with the first P positions being readable in parallel.

Read control logic circuit 806 can monitor the fill level of block buffers 802 and 804 and push new data elements (e.g., in groups of P) into the FIFOs based on the fill level. Thus, read control logic circuit 306 does not need to match the number of data elements loaded into a particular block buffer to the number of data elements consumed from that block buffer in a given cycle.

Read control logic circuit 806 can also send stream ready signals (strm1_rdy, strm2_rdy) to vector memory read interface 302 to indicate that the corresponding block buffer 802 or 804 is ready to accept data. Stream valid signals (strm1_valid, strm2_valid) can be provided from vector memory read interface 302 to indicate whether data elements (strm1_data, strm2_data) are present on corresponding data paths 821, 822. In some embodiments, read control logic circuit 806 can wait for the corresponding stream valid signal before generating a push signal to block buffer 802 or block buffer 804. During a typical sorting round, read control logic circuit 806 can control multiplexers 810 and 812 to deliver stream 1 data from data path 821 to buffer 802 and stream 2 data from data path 822 to buffer 804.

In some embodiments, data input to block buffers 802, 804 can be managed differently in the initial stage of a merge sort. As described above, merge sort can begin with an unsorted data set (block size 1). The first round (round counter R=0) can merge single data elements into blocks of size 2, the second round (R=1) can merge blocks size 2 into blocks of size 4, and so on. In a parallel implementation of the kind described herein, it may be desirable to accelerate the early rounds by forming sorted blocks of size P from the unsorted data before providing blocks to merge sort core 306. In some embodiments, presort circuit 814 can be used to form the sorted blocks of size P.

Figure 9:
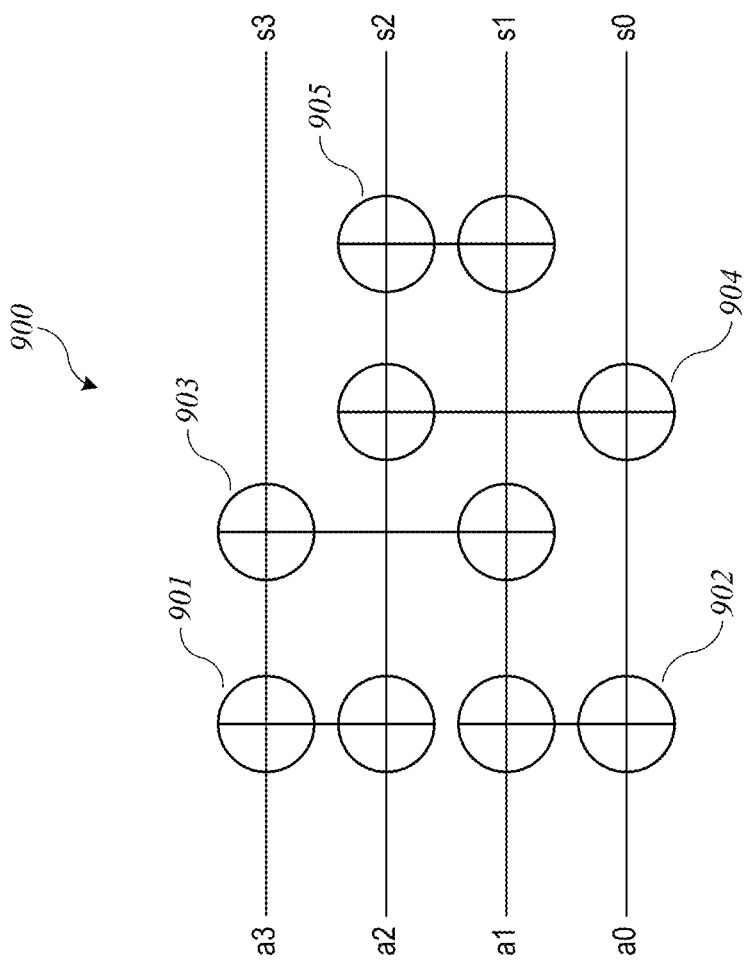
FIG. 9 shows a simplified schematic diagram of a presort circuit according to some embodiments.

FIG. 9 shows a simplified schematic diagram of a presort circuit 900 according to some embodiments. In some embodiments where P=4, circuit 900 can be used to construct blocks of size 4 from unsorted data at the outset of a merge sort operation. As shown, circuit 900 can include a network of compare-and-exchange circuits 901-905, each of which can be implemented as shown in FIG. 5B. The inputs can be four unsorted data elements (a0-a3); the outputs (s0-s3) can be the same four data elements arranged in sorted order (e.g., from lowest sort key to highest). In other words, presort circuit 900 can generate a block of size 4 from four unsorted data elements, thus implementing round 0 and round 1 of a merge sort. Circuit 900 illustrates the concept of a presort circuit; it will be appreciated that other circuits can be used and that circuits similar to circuit 900 can be constructed for different values of P.

Referring again to FIG. 8, during the initial stage of merge sort, read control logic circuit 806 can operate presort circuit 814 to receive and sort sets of P data elements in succession, thereby forming sorted data blocks of size P from an initially unsorted data set. In this example, all of the data elements can be provided via data path 821 in the initial stage. Read control logic circuit 806 can operate multiplexers 810 and 812 such that one block formed in presort circuit 814 is provided to buffer 802 and the next block is provided to buffer 804. Merge sort core 306 can then operate on the two input blocks of size P to create a merged block of size 2P. Thereafter the next pair of input blocks can be loaded into block buffers 802, 804, and the process can continue until all of the data has been merged into blocks of size 2P. After this initial stage (which can correspond to sorting rounds R=0, 1, and 2), presort circuit 814 can be disabled (or bypassed), and read control logic circuit 806 can operate multiplexer 810 to select data from data path 821 (stream 1) and multiplexer 812 to select data from data path 822 (stream 2).

Referring again to FIG. 3, vector memory read interface 302 can manage reading of data blocks from memory 330, and vector memory write interface 310 can manage writing of the merged data blocks to memory 330. As noted above, during a given round, vector memory read interface 302 can read from one of memory buffers 332, 334 while vector memory write interface 310 writes to the other of memory buffers 332, 334. In some embodiments, vector memory read interface 302 can maintain a current read address for each data stream (stream 1, also referred to as the "A" blocks, and stream 2, also referred to as the "B" blocks). Vector memory write interface 310 can maintain a current write address for output data. As described above, the output data can be provided as a single stream. Vector memory write interface 310 can write the output data sequentially to locations in the output buffer; thus, as each merged block is generated, it is written into contiguous memory locations in the output buffer.

It is noted that merge sort does not depend on which pairs of blocks are merged at any given round or in what order blocks are merged, as long as each block is a member of exactly one pair. Accordingly, in some embodiments a linear addressing scheme can be used to simplify the computation of read address offsets. For example, assuming an even number of blocks for a given round, the blocks in the first half of the filled portion of the input buffer (offsets 0 to [(L/2)−1]), where L is the total number of data elements in the data set, can be used as the "A" blocks (or stream 1) while the blocks in the second half of the filled portion of the input buffer (offsets L/2 to (L−1)) can be used as the "B" blocks (or stream 2). In some embodiments, for a given round (round counter R) and data set length L, vector memory read interface 302 can define the starting offset for "A" blocks as 0 and the starting offset for "B" blocks as $\{[(L>>R)+a]>>1\}<<R$, where $>>$ and $<<$ are right and left bit-shift operators and a is a parameter given by a=1 if binary(L) [R−1:0]≠0 and 0 otherwise. For each successive read for a data stream within a round, the address increments by one memory access width. As noted above, in the initial stage, all data elements can be read to stream 1, in which case stream 2 would be used after the initial stage.

Vector memory read interface 302 can enforce block boundaries. As noted, the data read width may or may not correspond to the block size at a given round, and a read may cross block boundaries. Vector memory read interface 302 can be configured to track the block size and the number of data elements added to each stream and can stop adding data elements to a stream when a block boundary is reached. In addition, vector memory read interface 302 can detect when a data block is shorter than the nominal block size for a given round. In embodiments described herein, merging can be managed such that there is not more than one "short" block in any given round and the short block (if there is one) is at the end of the data set. Vector memory read interface 302 can determine the presence of a short block from the block size (or round number) and the length of the data set. When a short block is present, vector memory read interface 302 can append "dummy" elements to the end of the short block so that the short block appears to be the same size as all other blocks. The dummy elements can be defined such that the sort key is higher than the highest valid sort key (for ascending sort), so that dummy elements always appear at the end of a merged output block. Similarly, in some instances, there may be an odd number of blocks at a given round. Where this is the case, vector memory read interface 302 can generate a block of "dummy" elements to be merged with the last block that contains real data elements. Accordingly, data read control unit 304 and merge sort core 306 do not require any special logic to handle an unpaired input block or a pair of input blocks with unequal numbers of elements.

At the output side, writeback control unit 308 can determine, based on the length of the data set, when the last valid data element for a given sorting round has been received. Any dummy elements that may have been added can be added in the last input block(s) to be merged and sorted to the end of the last merged block; accordingly, writeback control unit 308 can simply truncate the data output after the last valid data element has been sorted. This avoids overhead associated with reading and writing dummy elements from and to memory 330.

Figure 10:
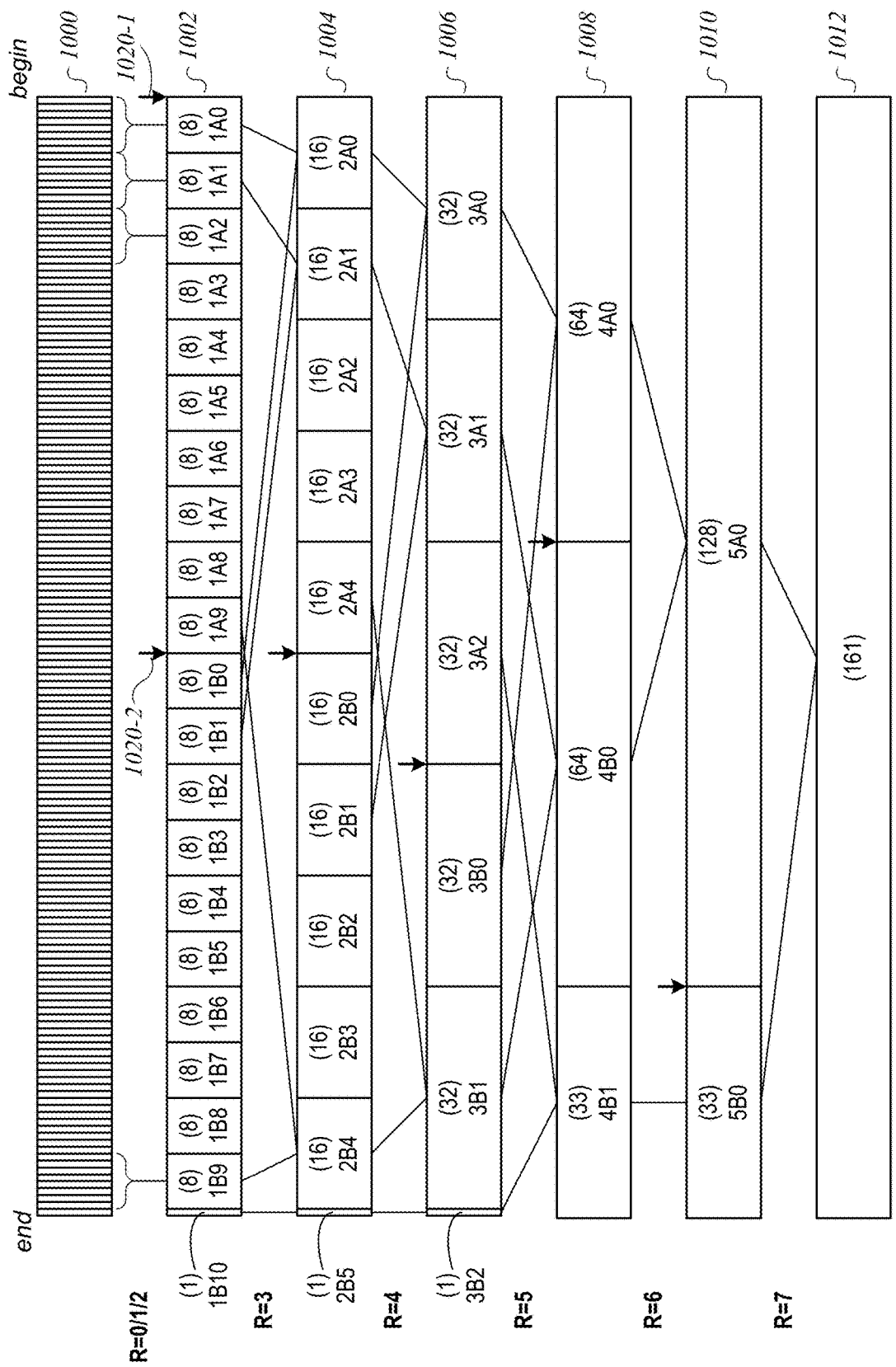
FIG. 10 shows a memory access pattern for a merge sort operation using a linear addressing scheme according to some embodiments.

FIG. 10 shows a memory access pattern for a merge sort operation using a linear addressing scheme according to some embodiments. Buffers 1000-1012 represent a data set of length L=161 elements at successive stages of merge sort. Buffer 1000 represents the initial state, in which the elements are completely unsorted (block size 1). Merge sort unit 300 can perform an initial stage of merge sort that encompasses sorting rounds R=0, 1, and 2 to merge the data into sorted blocks of size 8. For instance, the data set in buffer 1000 can be delivered as a single stream to presort circuit 814, which can deliver blocks of size P=4 to merge sort core 306. Merge sort core 306 can merge pairs of blocks to produce twenty blocks of size 2P=8, plus one block of size 1 as shown in buffer 1002. (Numbers in parenthesis indicate block size.) The next stage of merge sort corresponds to round R=3. The starting address for stream 1 (pointer 1020-1) corresponds to the beginning of the buffer, and the starting address for stream 2 (pointer 1020-2) corresponds to the midpoint of the buffer minus 1; the extra size-1 block, labeled 1B10, is included in stream 2. During round R=3, ten pairs of size-8 blocks, labeled 1Ai and 1Bi (i=0, 1, . . . , 9), are read and merged to form ten blocks of size 16. The extra size-1 block 1B10 can be padded to size 8 with dummy elements and merged with a dummy "A" block to produce a size-1 block, labeled 2B5, that contains the same data element as block 1B10.

During round R=4, five pairs of size-16 blocks, labeled 2Ai and 2Bi (i=0, 1, . . . , 4), are read and merged to form five blocks of size 32. Again, the odd block 2B5 can be padded to size 16 with dummy elements and merged with a dummy "A" block to produce a size-1 block, labeled 3B2, which contains the same data element as block 1B10.

During round R=5, two pairs of size-32 blocks, labeled 3A1 and 3B1 (i=0, 1), are read and merged to form two blocks of size 64. The last "A" block 3A2 is merged with block 3B2; as described above, block 3B2 can be padded to size 32 with dummy elements. The result is a block 4B1 of size 33.

During round R=6, one pair of size-64 blocks, labeled 4A0 and 4B0, are read and merged to form one block of size 128. The remaining "B" block 4B1, is merged with a dummy "A" block to produce a block 5B0 of size 33, which contains the same data elements (in the same sorted order) as block 4B1.

During round R=7, which is the last round, size-33 block 5B0 is padded to size 128 with dummy elements and merged with block 5A0 to form a single sorted data block of 161 elements in buffer 1012. At this point, the merge sort operation is complete.

FIG. 10 illustrates several features of using a linear addressing scheme. First, in any given round, pairs of blocks that are merged need not occupy contiguous locations in the input buffer. For instance, at round R=3, blocks 1A0 and 1B0, which are merged to form block 2A0, are not contiguous. This does not lead to unwanted overwriting in memory, since the output buffer is a different buffer from the input buffer. Second, the "A" blocks in a given round are all contiguous, as are the "B" blocks. Accordingly, a single start address for each stream in each round can be is determined in a straightforward manner from the round counter and the length of the data set, and successive reads for a stream can be performed by incrementing the address for that stream. Third, vector memory read interface 302 can easily handle cases where the number L of data elements in the data set is not a power of 2. Such cases are handled by allowing the last input block to be shorter than the nominal input block size for the round (which is $2^R$ for round counter R). Based on the length of the data set and the round counter, vector memory read interface 302 can determine when the last data element has been read and can add dummy elements to deliver a block of size $2^R$ to data read control unit 304. Fourth, vector memory read interface 302 can easily handle rounds with an odd number of blocks by creating a block of dummy elements to be merged with the odd block, as in rounds R=3, 4, and 6 in FIG. 10. As described above, writeback control unit 308 can use the data set length to determine when the last real (non-dummy) data element for a sorting round has been generated and avoid the overhead of writing dummy elements to memory (or reading them from memory). Accordingly, data read control unit 304 and merge sort core 306 can be configured to handle pairs of blocks of a nominal size (e.g., $2^R$), without additional logic to handle input blocks that are not of nominal size and/or rounds with an odd number of input blocks.

Figure 11:
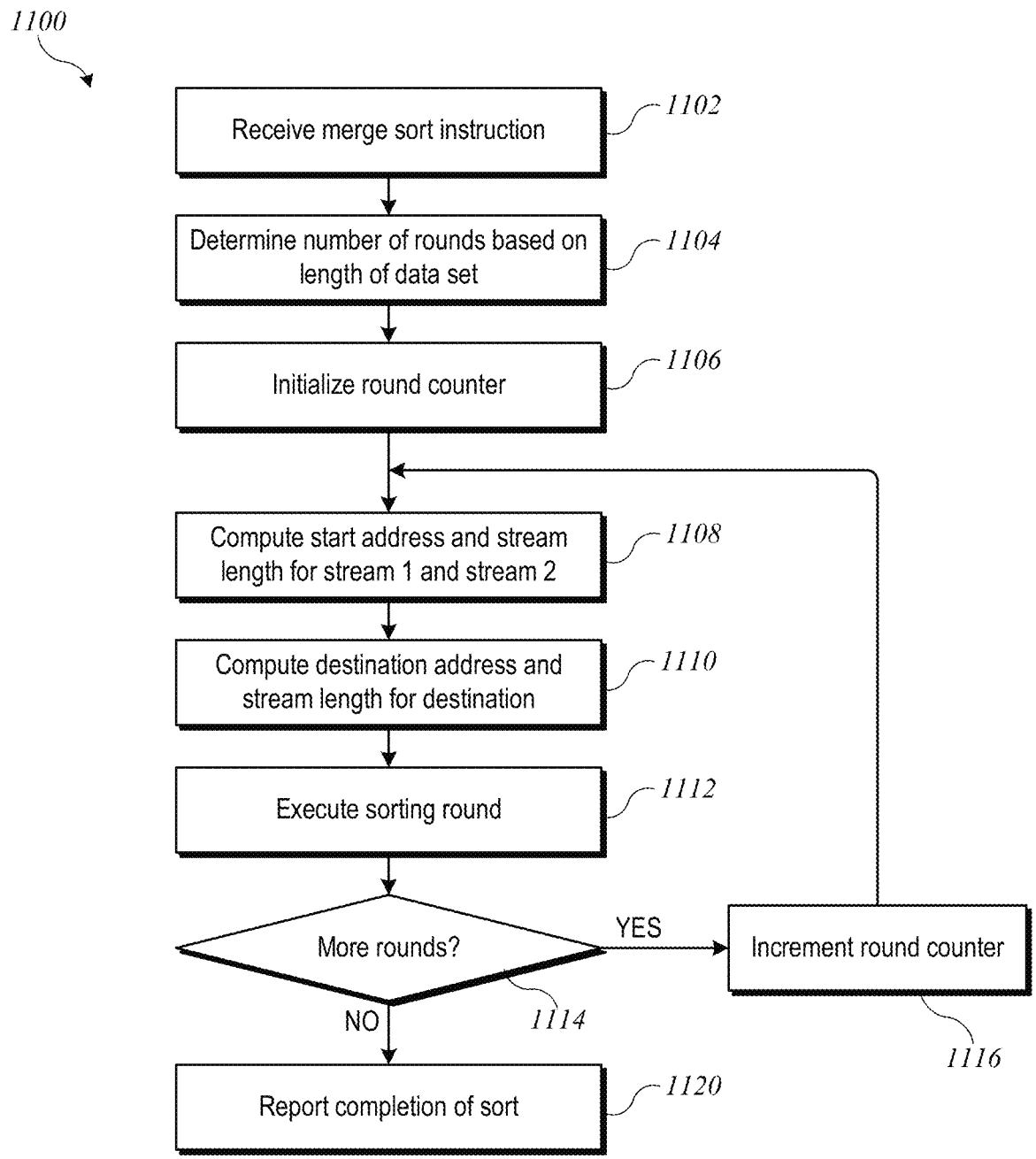
FIG. 11 shows a flow diagram of a process for executing a merge sort according to some embodiments.

To further illustrate operation of parallel merge sort unit 300, FIG. 11 shows a flow diagram of a process 1100 for executing a merge sort according to some embodiments. Process 1100 can be implemented, e.g., in parallel merge sort unit 300 of FIG. 3. At block 1102, top-level control interface 320 can receive an instruction to execute a merge sort on a data set. In some embodiments, the instruction can include a pointer to a memory location where the data set is stored, and top-level control interface 320 can load the data set into buffer 332 (or buffer 334) in memory 330. In some embodiments, the data set can be loaded into buffer 332 (or buffer 334) by another process before the instruction is sent to parallel merge sort unit 300. The merge-sort instruction can also include other parameters, such as the length of the data set, the direction of sort, and a bitmask defining which bits of each data element contain the sort key. Top-level control interface 320 can load these parameters into configuration registers 322 and/or otherwise provide the parameters to the processing engines (including vector memory read interface 302, data read control unit 304, merge sort core 306, writeback control unit 308, and vector memory write interface 310).

At block 1104, top-level control interface 320 can determine the number of sorting rounds based on the length of the data set. For example, if the round counter R is defined such that the block size at the input to a given round is $2^R$, then the maximum value of the round counter can be R for which $2^R<L\leq 2^{R+1}$. At block 1106, top-level control interface can initialize a round counter. In various embodiments, the round counter can be initialized to 0 or to a higher number if presorting is implemented. For instance, using circuit 800 with presort circuit 900, the first round generates blocks of size 8, and the round counter can be initialized to R=2. Top-level control interface 320 can load the round counter into configuration registers 322 and/or otherwise provide parameters to the processing engines (including vector memory read interface 302, data read control unit 304, merge sort core 306, writeback control unit 308, and vector memory write interface 310).

Top-level control interface 320 can control execution of the sorting rounds. For example, at block 1108, top-level control interface 320 can signal vector memory read interface 302 that a sorting round is beginning, and vector memory read interface 302 can determine start addresses and block sizes for the input data streams based on the round counter and data set length, e.g., as described above. In some embodiments, vector memory read interface 302 can be configured to use start addresses in buffer 332 if R is even and start addresses in buffer 334 if R is odd. At block 1110, top-level control interface 320 can signal vector memory write interface 310 that a sorting round is beginning, and vector memory write interface 310 can determine a start address for the output data stream based on the round counter. In some embodiments, vector memory write interface 310 can be configured to use the start address of buffer 332 if R is odd and the start address in buffer 334 if R is even; the starting offset can be the same (e.g., zero) for all rounds.

At block 1112, top-level control interface 320 can signal the processing engines (including vector memory read interface 302, data read control unit 304, merge sort core 306, writeback control unit 308, and vector memory write interface 310) to execute a sorting round. As described above, vector memory read interface 302 and merge sort core 306 can determine the input block size based on the current round counter value and can execute operations for each pair of input blocks. Top-level control interface 320 can receive signals from merge sort core 306 indicating when processing of a pair of input blocks is complete and can count the processed blocks to determine when all input blocks for the current round have been processed. It should be noted that top-level control interface 320 does not need to coordinate operations during processing of a block. In some embodiments, top-level control interface 320 may send control signals to data read control unit 304 and/or merge sort core 306 to initiate each block. When a round is finished, at block 1114, top-level control interface 320 can determine whether more rounds remain. If so, then at block 1116, top-level control interface 320 can increment the round counter and return to block 1108 to execute the next round. If, at block 1114, all rounds are finished, then at block 1120, top-level control interface 320 can signal completion of the merge sort. In various embodiments, top-level control interface 320 can provide an indicator of which buffer (332 or 334) contains the final sorted data set and/or write the final sorted data set to some other memory location accessible to other data processing components.

Figure 12:
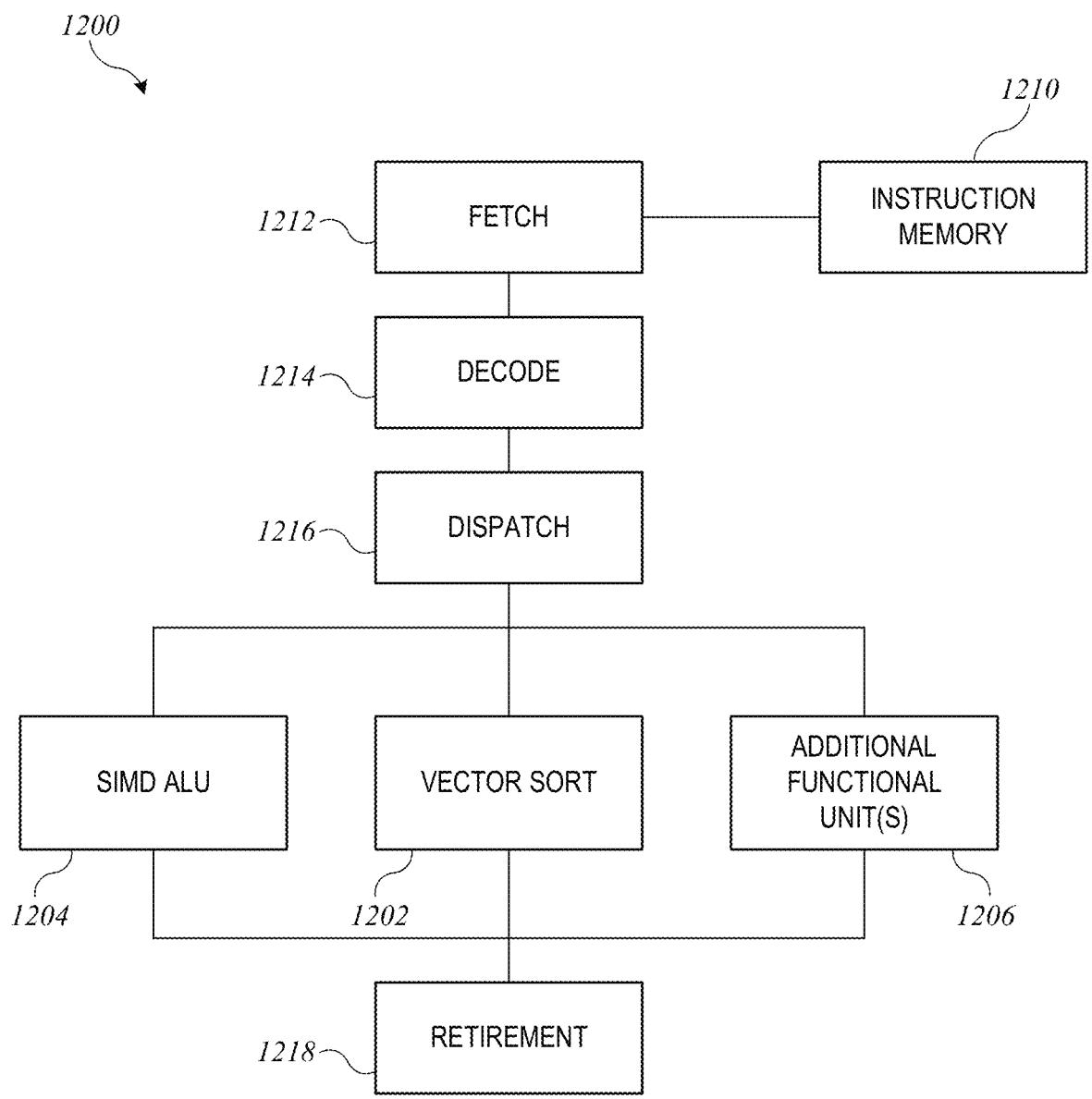
FIG. 12 shows a simplified block diagram of a microprocessor according to some embodiments.

In some embodiments, a parallel merge sort unit such as circuit 300 can be implemented as a functional unit in a microprocessor such as cellular modem processor 200 or other programmable digital signal processor. FIG. 12 shows a simplified block diagram of a microprocessor 1200 according to some embodiments. Microprocessor 1200 can be a scalar or vector (e.g., SIMD) processor and can execute instructions in order or out-of-order as desired. Microprocessor 1200 can include a set of functional units that execute various instructions. Examples of functional units include a parallel merge sort unit 1202, which can be implemented as parallel merge sort unit 300 described above. Other functional units can also be provided, such as a SIMD arithmetic logic unit (ALU) 1204, which can implement vector operations such as vector addition, vector subtraction, vector negation, vector bitwise logic, and so on. In some embodiments, the number of parallel lanes in SIMD ALU 1204 can match the width of memory access in memory 330. Other functional units 1206 can include, e.g., multipliers and/or special-purpose computation circuits, memory interface circuits that read data from and/or write data to external memory, and so on; some or all of functional units 1206 can be SIMD functional units with multiple parallel lanes. Apart from aspects relevant to parallel merge sort circuit 1202, components of microprocessor 1200 can be generally conventional in design and operation. For example, an instruction memory 1210 can include any memory circuit that stores program instructions to be executed by microprocessor 1200. The instructions can be in machine-executable code and can be generated from program code written in a higher-level language. Fetch circuit 1212 can fetch the instructions from instruction memory 1210, generally in program order. In some embodiments, fetch circuit 1212 can incorporate branch prediction, speculative fetch, and/or other optimizations as desired. Decode circuit 1214 can perform any necessary decoding of the fetched instructions. In some embodiments, decoding can include converting the fetched instruction into one or more sequential microinstructions that can be delivered to functional units, including parallel merge sort unit 1202. Depending on implementation, other examples of decoding operations can include register renaming, memory address translation, memory access (e.g., to retrieve operands), etc. Dispatch circuit 1216 can receive decoded instructions and send control signals to functional units 1202, 1204, 1206 to execute the instructions, selecting the appropriate functional unit based on the particular instruction. Dispatch of instructions to functional units can proceed in order or out-of-order as desired. In some embodiments, dispatch circuit 1216 can manage data dependencies so that instructions are not executed until their operands are ready. Retirement unit 1218 can perform post-execution processing, such as moving output data out of output registers of the functional units, notifying dispatch circuit 1216 of instruction completion, and so on. Any type of microprocessor architecture can be used, including pipelined architectures in which output data from one functional unit is provided as input data to a next functional unit in the pipeline, either directly or via a buffer.

To support operation of parallel merge sort unit 1202, the instruction set architecture of microprocessor 1200 can include the following instructions:

(1) An initialization instruction to initialize parallel merge sort unit 1202. For example, initialization can include loading the data set to be sorted into memory 330 (e.g., into buffer 332), and the initialization instruction may specify a source location from which the data set is to be loaded. In some embodiments, the initialization instruction may include other parameters such as the length of the data set, a bitmask identifying which bits of each data element correspond to the sort key, and/or a direction of sort (ascending or descending). Parallel merge sort unit 1202 can use the initialization parameters to configure comparators in merge sort core 306 (e.g., as described above with reference to FIGS. 5A, 5B, 6, and 8) to perform the appropriate comparison. Initialization can also include loading parameter values into initialization registers 322 in top-level control interface 320 and/or other register locations within parallel merge sort unit 1202.

(2) A merge-sort instruction to instigate execution of merge sort on the data set. In response to the merge-sort instruction, parallel merge-sort unit 1202 can operate its processing engines (e.g., as described above) to perform a merge sort operation. Upon completion, parallel merge sort unit 1202 can provide a buffer identifier indicating which of buffers 332, 334 contains the sorted data set.

In some embodiments, the initialization and merge-sort instructions can be combined into a single instruction. Other instructions, such as a writeback instruction to write the sorted data set from memory 330 to a memory shared with other components, can also be provided if desired.

As noted above, a data set containing any type and number of data elements can be sorted using circuit 300 or similar circuits. The size of a data element and the maximum number of data elements in a data set are matters of design choice, based on the particular application. It should be noted that components of circuit 300 (including merge sort core 306 and data read control unit 304) can be agnostic to the number of data elements in the data set and can handle input blocks of any size. The data elements provided to the sort circuit can contain any amount of information. As described above, in some embodiments, each data element can include a sort key and a pointer (or other reference to a memory location), and information other than the sort key can be stored in the referenced memory location. If desired, all information about each data element can be included in the data element as provided to the sort circuit; however, this may increase the amount of data that needs to be moved through the sort circuit as elements are sorted. In embodiments where the only desired output is a sorted list of metrics, the sort circuit can just receive the metrics. The degree of parallelism (P) is also a matter of design choice and can be selected based on considerations such as desired throughput, circuit area and power consumption, width of the vector memory access, degree of parallelism in other components of a processor in which circuit 300 is implemented, and so on.

While specific embodiments have been described, those skilled in the art will appreciate that variations and modifications are possible. For instance, a parallel merge sort circuit can include any degree of parallelism and can sort data sets of any desired size. Data can be in any format, including fixed-point (or integer), floating-point, real values, complex values, etc. The metric, or sort key, used for sorting can be any property having values that can be ordered from lowest to highest (or highest to lowest). As noted above, in some embodiments, the comparators can be reconfigurable for a desired sorting operation, e.g., for either ascending or descending numerical sort.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g.

passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A merge sort circuit comprising:
a parallel merge sort core including a partial merge sort circuit having a first set of inputs to receive a first input tuple including at least two first data elements sorted according to a sort key and a second set of inputs to receive a second input tuple including at least two second data elements sorted according to the sort key, the partial merge sort circuit being configured to produce a sorted output tuple including at least two data elements selected from the first and second input tuples and sorted according to the sort key and a selection signal indicating which of the data elements of the first and second input tuples were selected;
a first input buffer configured to store a plurality of data elements in order from a first data stream, to provide the first input tuple to the parallel merge sort core, and to discard one or more stored data elements in response to a first feedback signal from the parallel merge sort core;
a second input buffer configured to store a plurality of data elements from a second data stream, to provide the second input tuple to the parallel merge sort core, and to discard one or more stored data elements in response to a second feedback signal from the parallel merge sort core;
a vector memory read interface circuit configured to provide a first data stream for a first input data block to the first input buffer and a second data stream for a second input data block to the second input buffer; and
a read control logic circuit coupled to the first input buffer and the second input buffer and configured to control loading of data elements from the first data stream into the first input buffer and loading of data elements from the second data stream into the second input buffer based on respective fill levels of the first input buffer and the second input buffer.

2. The merge sort circuit of claim 1 further comprising:
a control interface configured to coordinate operation of the read control logic circuit and the parallel merge sort core to execute a plurality of sorting rounds on a data set having a plurality of data elements, wherein one or more of the sorting rounds includes using the parallel merge sort core to sort a pair of input data blocks to produce an output data block that includes the data elements in the pair of input data blocks.

3. The merge sort circuit of claim 1 wherein the parallel merge sort core further includes:
a first barrel shifter having a plurality of output paths coupled to the first set of inputs of the partial merge sort circuit and a plurality of input paths to receive the first input tuple from the first input buffer, the first barrel shifter being configured to apply a first cyclic shift to the first input tuple;
a second barrel shifter having a plurality of output paths coupled to the second set of inputs of the partial merge sort circuit and a plurality of input paths to receive the second input tuple from the second input buffer, the second barrel shifter being configured to apply a second cyclic shift to the second input tuple; and
a merge sort control logic circuit coupled to the first barrel shifter, the second barrel shifter, and the partial merge sort circuit, the merge sort control logic circuit being configured to determine the first cyclic shift and the second cyclic shift for a given operating cycle based at least in part on the selection signal generated during a previous operating cycle.

4. The merge sort circuit of claim 3 wherein the merge sort control logic circuit includes a first element counter and a second element counter and wherein the merge sort control logic circuit is further configured to:
increment the first element counter and the second element counter responsive to the selection signal; and
generate control signals for the first barrel shifter and the second barrel shifter based on the first element counter and the second element counter.

5. The merge sort circuit of claim 3 wherein the merge sort control logic circuit is further configured to generate the first feedback signal for the first input buffer and the second feedback signal for the second input buffer based at least in part on the selection signal.

6. The merge sort circuit of claim 1 further comprising:
a memory having sufficient capacity to store the data elements in a data set being sorted; and
a vector memory write interface circuit configured to write a stream of the sorted output tuples to the memory,
wherein the vector memory read interface circuit is configured to obtain the first data stream and the second data stream from the memory.

7. The merge sort circuit of claim 6 wherein the memory includes two buffers, each buffer having sufficient capacity to store the data elements in a data set being sorted and wherein the vector memory read interface circuit and the vector memory write interface circuit are configured to alternatingly read and write to the two buffers during a plurality of sorting rounds.

8. The merge sort circuit of claim 7 wherein the vector memory read interface circuit is configured to determine respective starting addresses for reading the first data stream and the second data stream based on a round counter and a size of the data set being sorted and to determine subsequent starting addresses by incrementing the starting addresses linearly.

9. The merge sort circuit of claim 1 wherein the read control logic circuit further includes:
  a presort circuit configured to receive a group of at least two unsorted data elements from the first data stream and to sort the group of at least two unsorted data elements into a block of at least two sorted data elements;
  a first multiplexer configured to selectably couple an output of the presort circuit or the first data stream to the first input buffer; and
  a second multiplexer configured to selectably couple the output of the presort circuit or the second data stream to the second input buffer.

10. The merge sort circuit of claim 1 wherein the vector memory read interface circuit is configured to read data elements from a buffer having a memory access width equal to at least two data elements.

11. A microprocessor comprising:
  a memory circuit configured to store a data set having a plurality of data elements, wherein the data elements include respective sort keys; and
  a merge sort functional unit coupled to the memory circuit and configured to execute a merge sort instruction on a data set loaded into the memory circuit,
  wherein the merge sort functional unit includes:
    a parallel merge sort core including a partial merge sort circuit having a first set of inputs to receive a first input tuple including at least two first data elements sorted according to a sort key and a second set of inputs to receive a second input tuple including at least two second data elements sorted according to the sort key, the partial merge sort circuit being configured to produce a sorted output tuple including at least two data elements selected from the first and second input tuples and sorted according to the sort key and a selection signal indicating which of the data elements of the first and second input tuples were selected;
    a first input buffer configured to store a plurality of data elements in order from a first data stream, to provide the first input tuple to the parallel merge sort core, and to discard one or more stored data elements in response to a first feedback signal from the parallel merge sort core;
    a second input buffer configured to store a plurality of data elements from a second data stream, to provide the second input tuple to the parallel merge sort core, and to discard one or more stored data elements in response to a second feedback signal from the parallel merge sort core;
    a vector memory read interface circuit configured to provide a first data stream corresponding to a first data block and a second data stream corresponding to a second data block;
    a read control logic circuit coupled to the first input buffer and the second input buffer and configured to control loading of data elements from the first data stream into the first input buffer and loading of data elements from the second data stream into the second input buffer based on respective fill levels of the first input buffer and the second input buffer; and
    a control interface configured to coordinate operation of the read control logic circuit and the parallel merge sort core to execute a plurality of sorting rounds on the data set, wherein one or more of the sorting rounds includes using the parallel merge sort core to sort a pair of input data blocks to produce an output data block that includes the data elements in the pair of input data blocks.

12. The microprocessor of claim 11 wherein the parallel merge sort core further includes:
  a first barrel shifter having a plurality of output paths coupled to the first set of inputs of the partial merge sort circuit and a plurality of input paths to receive the first input tuple from the first input buffer, the first barrel shifter being configured to apply a first cyclic shift to the first input tuple;
  a second barrel shifter having a plurality of output paths coupled to the second set of inputs of the partial merge sort circuit and a plurality of input paths to receive the second input tuple from the second input buffer, the second barrel shifter being configured to apply a second cyclic shift to the second input tuple; and
  a merge sort control logic circuit coupled to the first barrel shifter, the second barrel shifter, and the partial merge sort circuit, the merge sort control logic circuit being configured to determine the first cyclic shift and the second cyclic shift for a given operating cycle based at least in part on the selection signal generated during a previous operating cycle.

13. The microprocessor of claim 12 wherein the merge sort control logic circuit includes a first element counter and a second element counter and wherein the merge sort control logic circuit is further configured to:
  increment the first element counter and the second element counter responsive to the selection signal; and
  generate control signals for the first barrel shifter and the second barrel shifter based on the first element counter and the second element counter.

14. The microprocessor of claim 12 wherein the merge sort control logic circuit is further configured to generate the first feedback signal for the first input buffer and the second feedback signal for the second input buffer based at least in part on the selection signal.

15. The microprocessor of claim 11 further comprising:
  a memory having sufficient capacity to store the data elements in the data set; and
  a vector memory write interface circuit configured to write a stream of the sorted output tuples to the memory,
  wherein the vector memory read interface circuit is configured to obtain the first data stream and the second data stream from the memory.

16. The microprocessor of claim 15 wherein the memory includes two buffers, each buffer having sufficient capacity to store the data elements in the data set and wherein the vector memory read interface circuit and the vector memory write interface circuit are configured to alternatingly read and write to the two buffers during the plurality of sorting rounds.

17. The microprocessor of claim 16 wherein the vector memory read interface circuit is configured to determine respective starting addresses for reading the first data stream and the second data stream based on a round counter and a size of the data set being sorted and to determine subsequent starting addresses by incrementing the starting addresses linearly.

18. The microprocessor of claim 11 wherein the sort key corresponds to a sequential identifier of a data packet and the data elements further include pointers to memory locations where the data packets are stored.

19. The microprocessor of claim 11 wherein the merge sort instruction includes a bitmask identifying a subset of bits of the data elements as corresponding to the sort key.

20. The microprocessor of claim 11 wherein the read control logic circuit further includes:
- a presort circuit configured to receive a group of at least two unsorted data elements from the first data stream and to sort the group of at least two unsorted data elements into a block of at least two sorted data elements;
- a first multiplexer configured to selectably couple the output of the presort circuit or the first data stream to the first input buffer; and
- a second multiplexer configured to selectably couple the output of the presort circuit or the second data stream to the second input buffer.

* * * * *